United States Patent
Suzuki et al.

(10) Patent No.: US 6,727,956 B2
(45) Date of Patent: Apr. 27, 2004

(54) SYNC SIGNAL GENERATOR CIRCUIT FOR GENERATING STABLE PERIOD SYNC SIGNALS

(75) Inventors: Yoshito Suzuki, Tokyo (JP); Kouji Minami, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 420 days.

(21) Appl. No.: 09/842,895

(22) Filed: Apr. 27, 2001

(65) Prior Publication Data

US 2002/0051079 A1 May 2, 2002

(30) Foreign Application Priority Data

Nov. 2, 2000 (JP) ........................................ 2000-335413

(51) Int. Cl.[7] ................................................. H04N 5/06
(52) U.S. Cl. ...................................... 348/524; 348/521
(58) Field of Search ................................. 348/521–524, 348/530, 536, 533, 540, 542, 547; 327/160, 162; 382/66

(56) References Cited

U.S. PATENT DOCUMENTS

| 4,387,397 | A | * | 6/1983 | Dietz | ......................... 358/154 |
| 5,414,470 | A | | 5/1995 | Hotta et al. | .................. 348/530 |
| 5,771,076 | A | * | 6/1998 | Kim | ........................... 348/524 |
| 5,831,682 | A | * | 11/1998 | Iwasaki et al. | ............. 348/525 |
| 6,052,153 | A | * | 4/2000 | Marsanne et al. | .......... 348/542 |

FOREIGN PATENT DOCUMENTS

| JP | A2177681 | 7/1990 |
| JP | A2194774 | 8/1990 |

* cited by examiner

*Primary Examiner*—Victor R. Kostak
(74) *Attorney, Agent, or Firm*—Birch, Stewart, Kolasch & Birch, LLP

(57) ABSTRACT

A sync signal generator circuit including a first counter which is reset each time it detects a reference edge of the input sync signal, a first register for holding a first value immediately before the first counter is reset, a reset signal generator for generating reset pulses, a second counter which is reset each time it receives a reset pulse, a second register for holding a second value immediately before the second counter is reset, and a sync pulse generator for generating an output sync signal on the basis of the reset pulses. The reset pulse is generated each time the counted value of the second counter matches a predetermined value or each time the first counter detects the reference edge while an absolute value of a difference between the counted value of the second counter and the second value held in the second register is not greater than a permissible value of period fluctuations.

10 Claims, 15 Drawing Sheets

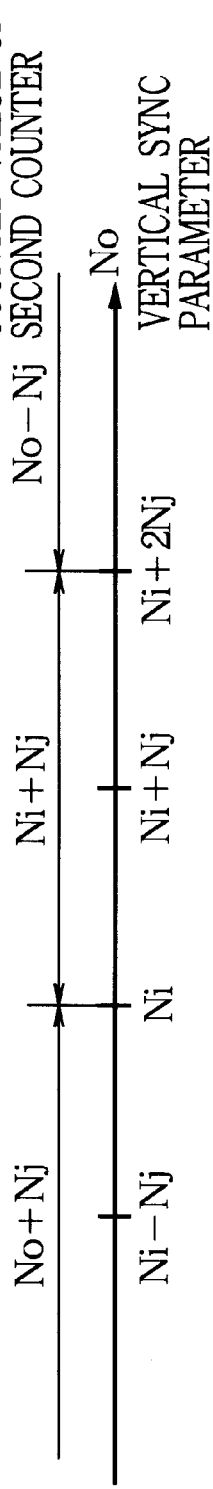
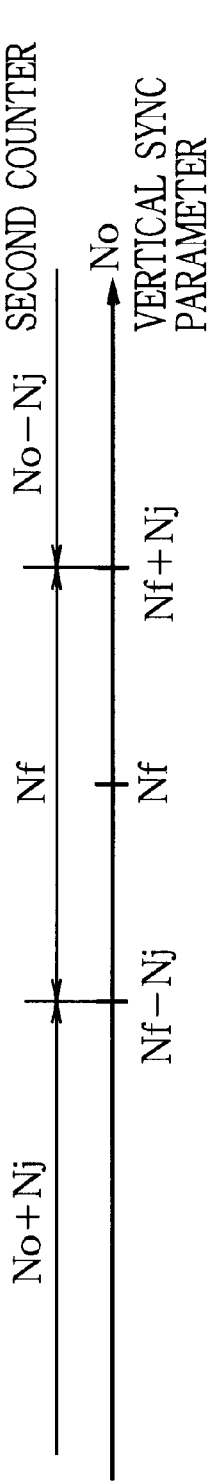

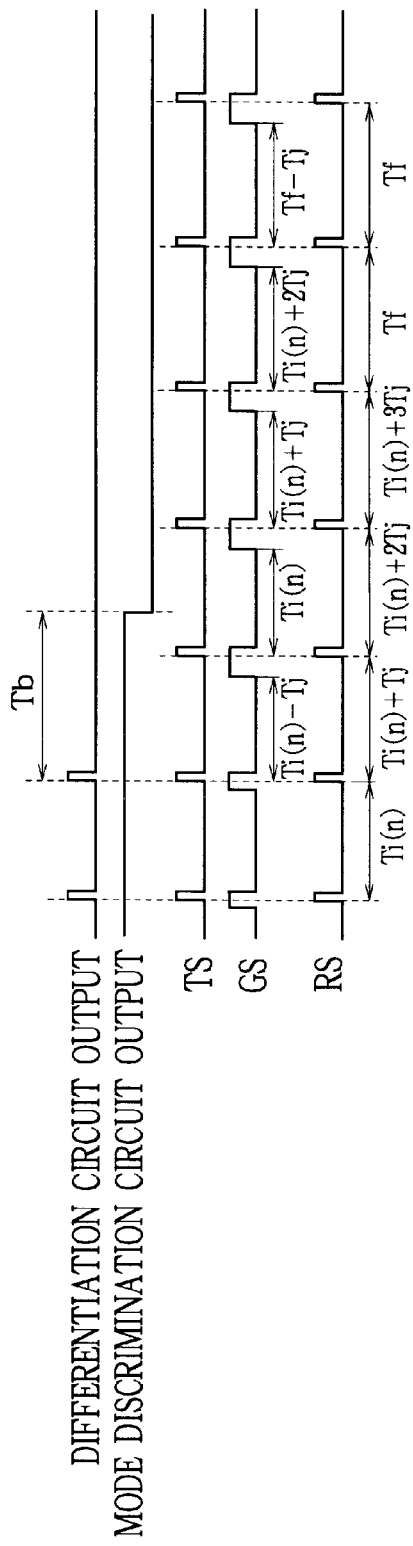
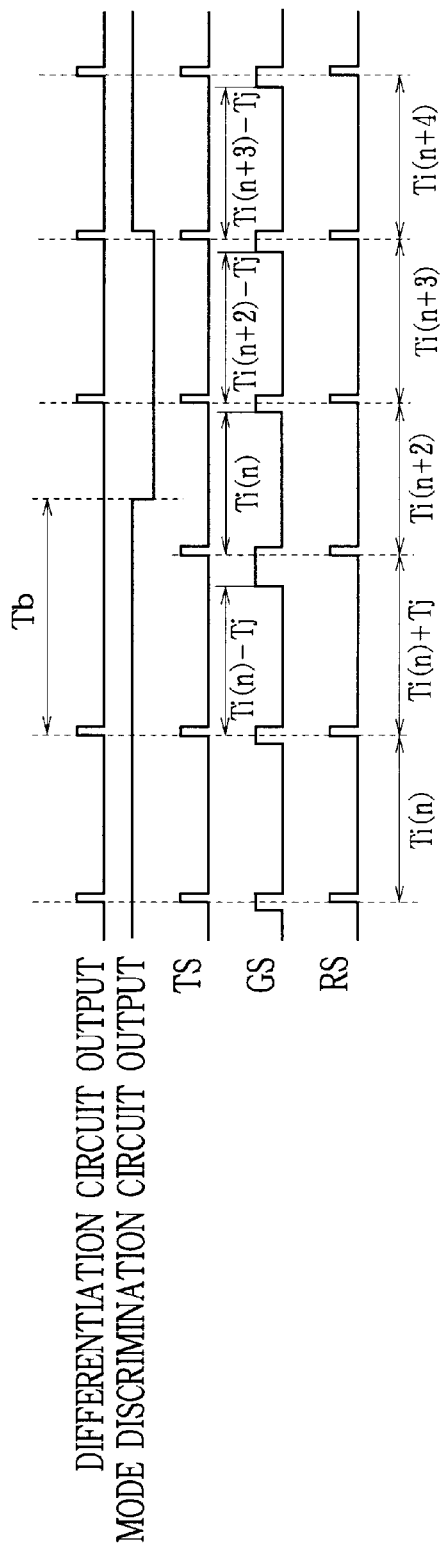

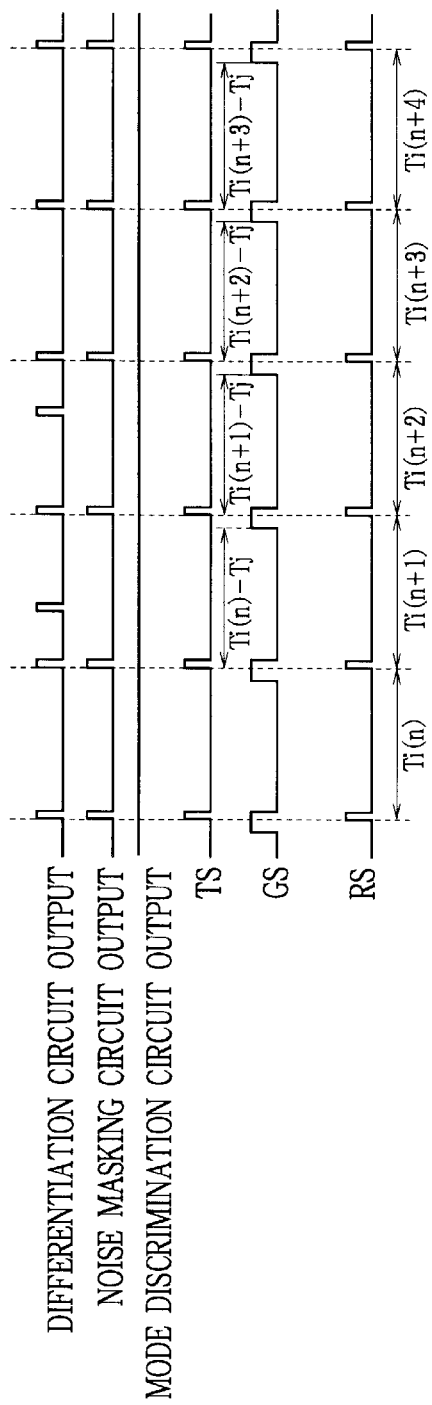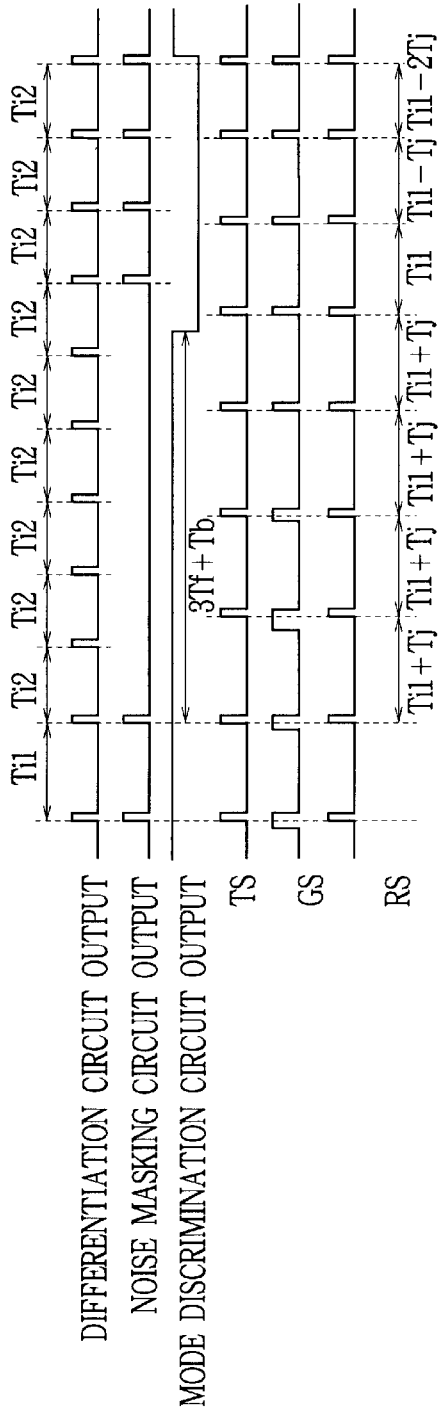

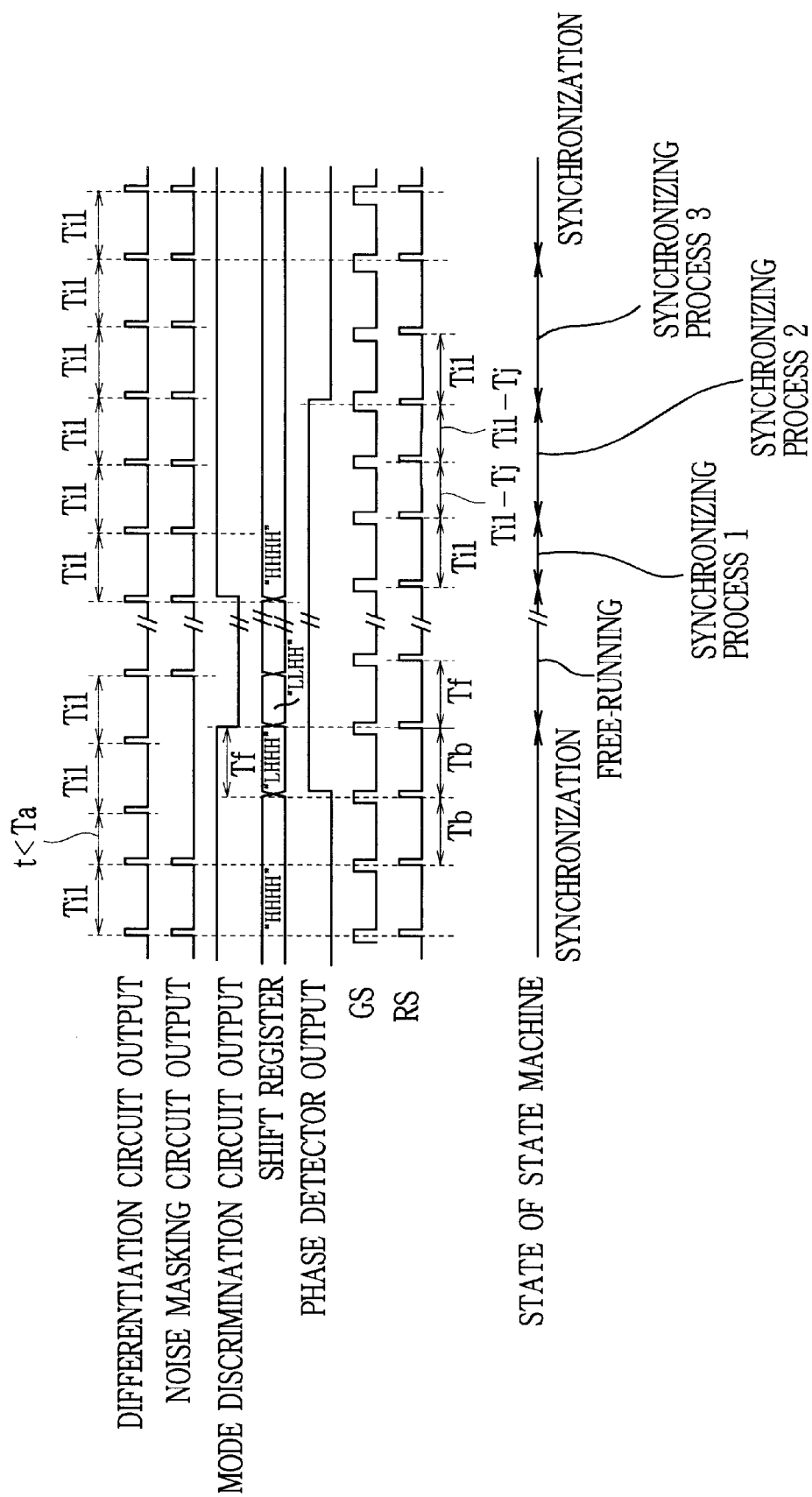

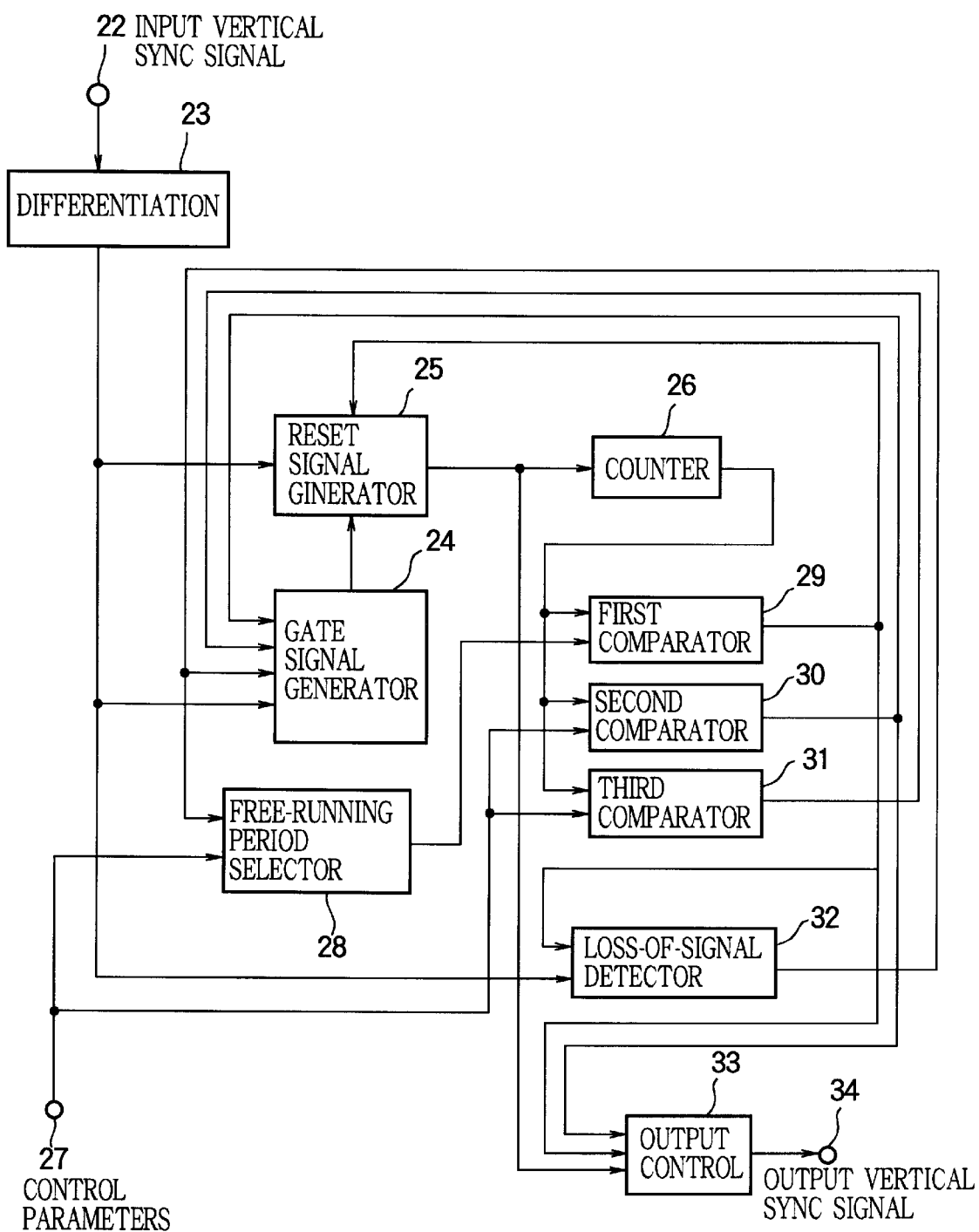

SYNC SIGNAL GENERATOR CIRCUIT FOR GENERATING STABLE PERIOD SYNC SIGNALS

BACKGROUND OF THE INVENTION

The present invention relates to a sync signal generator circuit for use in visual equipment such as a display apparatus and a recording/reproducing apparatus, and particularly relates to a sync signal generator circuit for generating a sync signal with a stable period.

In general, the sync signal that is used for displaying an image or recording image data in visual equipment is required to have a stable period. However, if the input is in a loss-of-signal state, no sync signal is detected. Further, when TV waves received by an antenna are very weak or immediately after a receiving channel is switched, a period of the sync signal may be temporarily disturbed. For this reason, Japanese Patent Kokai Publication No. 02-177681 published on Jul. 10, 1990 (corresponding to Japanese Patent No.2,584,309), for instance, proposes a method of generating a sync signal with a stable period even if a period of the input sync signal is disturbed. FIG. 10 is a block diagram showing the prior art sync signal generator circuit disclosed in this publication.

In FIG. 10, a reference numeral 22 denotes an input terminal to which a vertical sync signal is inputted, 23 denotes a differentiation circuit for the input vertical sync signal, 24 denotes a gate signal generator, 25 denotes a reset signal generator, and 26 denotes a counter. The differentiation circuit 23 detects a reference edge (namely, a leading edge) of the vertical sync signal inputted to the input terminal 22, thereby outputting a pulse corresponding to the reference edge. The gate signal generator 24 generates a gate signal on the basis of the output of the differentiation circuit 23 and the outputs of a second comparator 30, a third comparator 31, and a loss-of-signal detector 32, which will be described later. The reset signal generator 25 generates reset pulses on the basis of the outputs of the gate signal generator 24, the differentiation circuit 23, and a first comparator 29, which will be described later. The counter 26 counts clock pulses, and resets the counted value when it receives the reset pulse outputted from the reset signal generator 25.

Furthermore, in FIG. 10, a reference numeral 27 denotes a terminal, and 28 denotes a free-running period selector. To the terminal 27 four control parameters are inputted. The four control parameters consist of the two different parameters that determine timings of opening and closing a gate (not shown) of the reset signal generator 25 and the other two different parameters that determine the free-running period of the output sync signal. The free-running period selector 28 selects either of the two different free-running periods inputted to the terminal 27 in accordance with the output of the loss-of-signal detector 32, which will be described later.

Moreover, in FIG. 10, a reference numeral 29 denotes the first comparator, 30 denotes the second comparator, 31 denotes the third comparator, 32 denotes the loss-of-signal detector, 33 denotes an output control circuit, and 34 denotes an output terminal for the output vertical sync signal. The first comparator 29 compares the output of the counter 26 with the free-running period selected by the free-running period selector 28. The second comparator 30 compares the output of the counter 26 and one of the parameters inputted to the terminal 27 to detect the timing of closing the gate. The third comparator 31 compares the output of the counter 26 and one of the parameters inputted to the terminal 27 to detect the timing of opening the gate. The loss-of-signal detector 32 detects the state of the input vertical sync signal inputted to the input terminal 22 on the basis of the outputs of the differentiation circuit 23 and the first comparator 29. The output control circuit 33 prevents the vertical sync signal having too short period from being generated on the basis of the outputs of the reset signal generator 25, the first comparator 29, and the second comparator 30.

The sync signal generator circuit shown in FIG. 10 works as described below. The differentiation circuit 23 outputs a pulse each time a reference edge of the input vertical sync signal is detected. The gate signal that is outputted from the gate signal generator 24 becomes at a high level after the third comparator 31 detects the timing of opening the gate. Further, the gate signal becomes at a low level after the output of the differentiation circuit 23 goes high, after the second comparator 30 detects the timing of closing the gate thereby bringing its output high, or after the loss-of-signal detector 32 detects a loss-of-signal state thereby bringing its output high. If the output of the gate signal generator 24 is at a low level, the reset signal generator 25 closes the gate and inhibits passage of the output of the differentiation circuit 23. If the output of the gate signal generator 24 is at a high level, the reset signal generator 25 opens the gate and allows passage of the output of the differentiation circuit 23, thereby sending it to the counter 26 as a reset pulse of the counter 26. In addition, the reset signal generator 25 generates a reset pulse also when the first comparator 29 detects that the counted value of the counter 26 reaches a value corresponding to a free-running period selected by the free-running period selector 28.

Of the four parameters inputted to the terminal 27, the two different parameters that determine the period of the output sync signal correspond to a vertical period specified in the television signal standard and a little longer period, respectively. The free-running period selector 28 selects the vertical period specified in the standard if the loss-of-signal detector 32 detects a loss-of-signal state, thereby outputting a high level signal. Further, the free-running period selector 28 selects the period a little longer than the vertical period specified in the standard if the loss-of-signal detector 32 outputs a low level signal. The loss-of-signal detector 32 contains shift registers. When the output of the differentiation circuit 23 goes high, a high value is loaded into the first-stage shift register of the loss-of signal detector 32. Further, when the first comparator 29 detects that the counted value of the counter 26 reaches a value corresponding to the free-running period selected by the free-running period selector 28, a low value is loaded into the first-stage shift register. Each time a new value is loaded into the first-stage shift register, the values held in the respective shift registers are shifted to the next-stage registers at the same time. Accordingly, if the loss-of-signal state continues for a certain period, values of all shift registers become high. The output of the loss-of-signal detector 32 goes high if all the values of the shift registers are high, and goes low at the other times. The output control circuit 33 inhibits passage of the reset pulse outputted from the reset signal generator 25 between the instant when the first comparator 29 detects that the counted value of the counter 26 reaches a value corresponding to the free-running period selected by the free-running period selector 28 and the instant when the gate is closed by the gate signal generator 24.

The prior art vertical sync signal generator circuit as described above can suppress the generation of a vertical sync signal having too long or short period, thereby generating a vertical sync signal having a stable period even in the loss-of-signal state.

FIGS. 11A to 11D are timing charts indicating the output of the differentiation circuit 23, the counted value of the counter 26, the gate signal generated by the gate signal generator 24, the reset pulses generated by the reset signal generator 25, the output of the loss-of-signal detector 32, and the vertical sync signal outputted from the output terminal 34.

FIG. 11A shows a case where the sync signal generator circuit prevents the output vertical sync signal having too short period from being outputted even when the input vertical sync signal having too short period is inputted to the input terminal 22. In FIG. 11A, a symbol $T_1$ denotes a period between the instant when the output of the differentiation circuit 23 goes high and the instant when the gate of the reset signal generator 25 opens (namely, when the gate signal generated by the gate signal generator 24 goes high). The gate opens when the counted value of the counter 26 reaches $N_1$. While the gate is closed (namely, the gate signal is at a low level), the output of the differentiation circuit 23 cannot pass through the reset signal generator 25 so that no reset pulse is generated and the output vertical sync signal having too short period does not appear at the output terminal 34.

FIG. 11B shows a case where the output vertical sync signal having a free-running period is generated when the period of the input vertical sync signal temporarily becomes too long. In FIG. 11B, a symbol $T_2$ denotes a little longer period than the vertical period specified in the standard. While the input vertical sync signal is periodically inputted to the input terminal 22, the output of the loss-of-signal detector 32 is at a low level, so that the free-running period selected by the free-running period selector 28 becomes $T_2$, which is a little longer than the vertical period specified in the standard. Meanwhile, the counted value of the counter 26 is set to $N_2$, and when the first comparator 29 detects this timing, the reset signal generator 25 generates a reset pulse. In addition, a symbol $T_3$ denotes a period between the instant when the counter 26 counts the value $N_2$ and the instant when the gate signal generator 24 closes the gate in accordance with the output of the second comparator 30. Further, a symbol t denotes a certain period longer than the period $T_3$. The input vertical sync signals within the period $T_3$ after a free-running vertical sync signal is generated are blocked by the output control circuit 33 and do not appear at the output terminal 34.

FIG. 11C shows a case where the output sync signal having the free-running period is generated if no input sync signal is inputted to the input terminal 22, establishing the loss-of-signal state. In FIG. 11C, a symbol $T_4$ denotes a period corresponding to the vertical period specified in the standard. If the loss-of-signal detector 32 uses a four-bit shift register, all the values of the shift register go high and the output of the loss-of-signal detector 32 goes high when the sync signals having the free-running period are generated four times while no vertical sync signal is inputted. After that, the free-running period selected by the free-running period selector 28 changes from $T_2$ to $T_4$.

FIG. 11D shows a case where the output vertical sync signal outputted from the output terminal 34 is brought into synchronization with the input vertical sync signal when the input vertical sync signal begins to be inputted to the input terminal 22 during the loss-of-signal state. When the input sync signal is inputted to the input terminal 22, the output of the loss-of-signal detector 32 goes low, and the free-running period selector 28 accordingly changes the free-running period from $T_4$ to $T_2$. Because the period $T_2$ corresponds to a period a little longer than the vertical period specified in the standard, if the period of the input sync signal inputted to the input terminal 22 is close to the period $T_4$, the output of the differentiation circuit 23, which was originally blocked by the gate signal generated by the gate signal generator 24, appears while the gate signal is in the open state after an appropriate period, establishing the synchronization between the input sync signal and the output sync signal.

The above-described sync signal generator circuit, however, is designed under the assumption that it is applied to some limited standards such as an NTSC and a PAL. Therefore, it is difficult to apply the above-described sync signal generator circuit to an input sync signal having a wide variety of vertical periods, namely, a variety of video signal formats which use non-standard signals not conforming to the above-mentioned standards.

To cover a wide range of vertical period, a period $T_1$ between the instant when the output of the differentiation circuit 23 goes high and the instant when the gate opens the gate must be short, and the free-running period $T_2$ must belong. By doing this, even if an input sync signal having a period close to the period $T_1$ is inputted, the vertical period temporarily changes widely to be the same as the free-running period $T_2$ when the sync signal generator circuit enters the free-running state. On the contrary, even if a vertical sync signal having a period close to the free-running period $T_2$ is temporarily disturbed to have a period close to the period $T_1$, an output sync signal having a short period is directly outputted from the output terminal 34 because the gate is in the open state meanwhile, resulting in the large fluctuation of the period in the output sync signal.

On the other hand, if the period $T_1$ is increased and the free-running period $T_2$ is decreased to obtain a stable vertical period, a wide range of vertical period cannot be simply covered, so that it is necessary to identify the format of an input video signal by some means and to reset the control parameter inputted to the terminal 27 to an appropriate value in accordance with the result of determination. However, it is generally difficult to accurately discriminate among all formats if an infinite number of non-standard signals are included. For instance, if the period of the input sync signal inputted to the input terminal 22 and the period $T_2$ are set to almost the same values because of a wrong format determination or if the period $T_2$ has to be minimized to obtain a very stable vertical period, the input sync signal and the output sync signal have almost the same period, as shown in FIG. 11D, so that it takes a very long time for the synchronizing process, in which the input sync signal and the output sync signal are synchronized.

SUMMARY OF THE INVENTION

It is an object of the present invention to provide a sync signal generator circuit which can generate a sync signal having a stable period and which can be applied to a wide variety of input sync signals.

According to the present invention, a sync signal generator circuit which receives a first sync signal to generate a second sync signal, comprises a first counter which counts predetermined clock pulses to output a counted value and which resets the counted value of the first counter each time the first counter detects a reference edge of the first sync signal; a first register which holds a first value $N_i$ which is the counted value of the first counter immediately before the first counter is reset; a reset signal generator which generates a reset pulse; a second counter which counts predetermined clock pulses to output a counted value and which resets the counted value of the second counter each time the second counter receives the reset pulse; a second register which holds a second value $N_o$ which is the counted value of the second counter immediately before the second counter is reset; and a sync pulse generator which generates the second sync signal on the basis of the reset pulse. The reset signal generator generates the reset pulse each time the counted value of the second counter matches a predetermined value $N_p$ or each time the first counter detects the reference edge of the first sync signal while an absolute value of a difference between the counted value of the second counter and the second value $N_o$ is not greater than a predetermined permissible value $N_j$ of a period fluctuation of the second sync signal, the predetermined value $N_p$ being equal to a reference value $N_r$ if the reference value $N_r$ which is predetermined on the basis of the first value $N_i$, is equal to the second value $N_o$, the predetermined value $N_p$ being greater than the second value $N_o$ and not greater than a value $N_o+N_j$ if the reference value $N_r$ is greater than the second value $N_o$, the predetermined value $N_p$ being not smaller than a value $N_o-N_j$ and smaller than the second value $N_o$ if the reference value $N_r$ is smaller than the second value $N_o$.

Further, the reset signal generator may comprise a timing signal generator which generates a timing pulse on the basis of the reference edge of the first sync signal and the counted value of the second counter; a gate signal generator which generates a gate signal, the gate signal being in an open state from the instant when the counted value of the second counter becomes not smaller than a predetermined value to the instant when the reset signal generator generates the reset pulse, the gate signal being in a close state at the other times; and a gate circuit which allows passage of the timing pulse as the reset pulse when the gate signal is in the open state and which inhibits passage of the timing pulse when the gate signal is in the close state.

Furthermore, the sync signal generator circuit may comprise a mode discrimination circuit, which outputs a first mode discrimination signal if the first value $N_i$ is kept to be not smaller than a predetermined lower-limit value $N_a$ and smaller than a predetermined upper-limit value $N_b$ throughout a first predetermined period, outputs a second mode discrimination signal if the first value $N_i$ is kept to be smaller than the lower-limit value $N_a$ or not smaller than the upper-limit value $N_b$ throughout a second predetermined period, and continues outputting the immediately preceding discrimination signal at the other conditions. If the mode discrimination circuit is outputting the second mode discrimination signal, the reset signal generator generates no reset pulse even when the first counter detects the reference edge of the first sync signal while the absolute value of the difference between the counted value of the second counter and the second value $N_o$ is not greater than the predetermined permissible value $N_j$.

Moreover, the sync signal generator circuit may comprise an external circuit which changes the lower-limit value $N_a$ and the upper-limit value $N_b$ on the basis of the first value $N_i$.

In addition, the reference value $N_r$ is set to $N_i+N_j$ or $N_i-N_j$ when the mode discrimination circuit is outputting the first mode discrimination signal, and the reference value $N_r$ is set to a predetermined free-running period value $N_f$ when the mode discrimination circuit is outputting the second mode discrimination signal.

Further, the sync signal generator circuit may comprise an external circuit which changes the free-running period value $N_f$ on the basis of the first value $N_i$.

Furthermore, the reference value $N_r$ is set to a value greater than the first value $N_i$ and smaller than $N_i+N_j$ if the first value held in the first register is equal to the second value held in the second register or if the generation of the reset pulse by the reset signal generator results from the detection of reference edge of the first sync signal.

Moreover, the sync signal generator circuit may comprise a noise masking circuit which selectively allows passage of the reference edge of the first sync signal. The noise masking circuit obstructs the passage the reference edge of the first sync signal when the counted value of the first counter is not greater than a predetermined value. The reset of the first counter is performed on the basis of the reference edge of the first sync signal which has passed through the noise masking circuit.

In addition, the sync signal generator circuit may comprise a phase detector which detects whether the reference edge of the first sync signal leads or lags behind with respect to the reset pulse by comparing either the counted value of the second counter when the reference edge of the first sync signal is inputted or the counted value of the first counter when the reset signal generator generates the reset pulse with a predetermined threshold. If the mode discrimination circuit is outputting the first mode discrimination signal and the phase detector judges that the reference edge of the first sync signal is leading with respect to the reset pulse, the reference value $N_r$ is set to a value not smaller than $N_i-N_j$ and not greater than the first value $N_i$. If the mode discrimination circuit is outputting the first mode discrimination signal and the phase detector judges that the reference edge of the first sync signal is lagging behind with respect to the reset pulse, the reference value $N_r$ is set to a value not smaller than the first value $N_i$ and not greater than $N_i+N_j$.

Further, the reset signal generator includes a state machine, a state of which is changed on the basis of the first value $N_i$; and the reference value $N_r$ is determined on the basis of the state of the state machine.

BRIEF DESCRIPTION OF THE INVENTION

The present invention will become more fully understood from the detailed description given hereinbelow and the accompanying drawings which are given by way of illustration only, and thus are not limitative of the present invention, and wherein:

FIGS. 3A and 3B are diagrams showing the operation of the timing signal generator in the sync signal generator circuit of FIG. 1;

FIGS. 4A to 4C are timing charts showing the operation of the sync signal generator circuit of FIG. 1;

FIGS. 6A to 6C are timing charts showing the operation of the sync signal generator circuit of FIG. 5;

FIGS. 9A and 9B are timing charts showing the operation of the sync signal generator circuit of FIG. 7;

FIG. 10 is a block diagram showing the prior art sync signal generator circuit.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
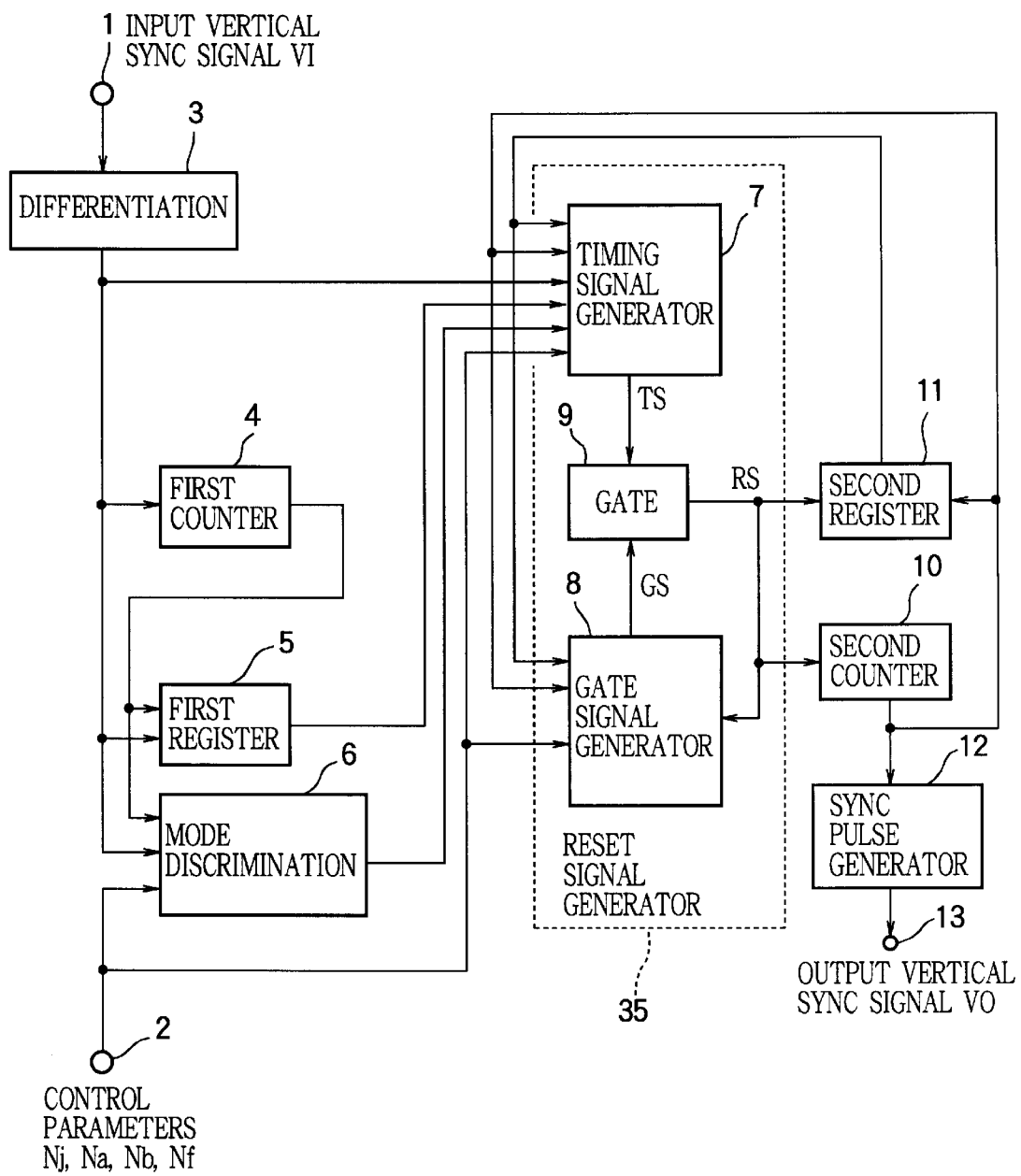
FIG. 1 is a block diagram showing a configuration of a sync signal generator circuit according to a first embodiment of the present invention.

FIG. 1 is a block diagram showing a configuration of a sync signal generator circuit according to the first embodiment of the present invention. In FIG. 1, a reference numeral 1 denotes an input terminal to which a vertical sync signal $V_I$ is inputted, and 2 denotes a terminal to which predetermined control parameters are inputted. The control parameters inputted to the terminal 2 include a permissible period fluctuation value $N_j$ of an output vertical sync signal $V_o$, a lower-limit value $N_a$ of the synchronization range, an upper-limit value $N_b$ of the synchronization range, and a free-running period value $N_f$.

In addition, in FIG. 1, a reference numeral 3 denotes a differentiation circuit, 4 denotes the first counter, and 5 denotes a first register. The differentiation circuit 3 detects a reference edge (namely, a leading edge) of the vertical sync signal $V_I$ inputted to the input terminal 1. The first counter 4 counts predetermined clock pulses and resets the counted value to a predetermined value each time the differentiation circuit 3 detects the reference edge of the vertical sync signal $V_I$. The first register 5 holds the first value $N_i$ which is the counted value of the first counter 4 immediately after the differentiation circuit 3 detects the reference edge of the vertical sync signal $V_I$. The first value $N_i$ held in the first register 5 corresponds to a period of the input vertical sync signal $V_I$ inputted to the input terminal 1.

Moreover, in FIG. 1, a reference numeral 6 denotes a mode discrimination circuit, 7 denotes a timing signal generator, 8 denotes a gate signal generator, 9 denotes a gate circuit, and 35 denotes a reset signal generator. The reset signal generator 35 includes the timing signal generator 7, the gate signal generator 8, and the gate circuit 9. The mode discrimination circuit 6 determines whether or not the period of the input vertical sync signal $V_I$ is within a predetermined synchronization range, on the basis of the lower-limit value $N_a$ and the upper-limit value $N_b$ of the synchronization range of the input vertical sync signal $V_I$. The timing signal generator 7 generates timing pulses TS on the basis of the permissible period fluctuation value $N_j$, the free-running period value $N_f$, the output of the differentiation circuit 3, the output of the first register 5, the output of the mode discrimination circuit 6, the output of the second counter 10, which will be described later, and the output of the second register 11. The gate signal generator 8 generates a gate signal GS based on the permissible period fluctuation value $N_j$ and the output of the second counter 10. The gate circuit 9 generates reset pulses RS for resetting the second counter 10 on the basis of the timing pulses TS and the gate signal GS.

Further, in FIG. 1, a reference numeral 10 denotes a second counter, 11 denotes a second register, 12 denotes a sync pulse generator, and 13 denotes an output terminal from which the vertical sync signal $V_o$ generated by the sync pulse generator 12 is outputted. The second counter 10 counts predetermined clock pulses and resets the counted value to a predetermined value each time the gate circuit 9 outputs the reset pulse RS. The second register 11 holds a second value $N_o$ which is the counted value of the second counter 10 immediately after the gate circuit 9 outputs the reset pulse RS. The second value $N_o$ corresponds to a period of the vertical sync signal $V_o$ outputted from the output terminal 13. The sync pulse generator 12 generates the vertical sync signal $V_o$ having a period based on the second value $N_o$.

The sync signal generator circuit shown in FIG. 1 works as described below. First, the output of the differentiation circuit 3 goes high (namely, the differentiation circuit 3 outputs a pulse) each time the reference edge of the vertical sync signal $V_I$ is detected. The first counter 4 resets the counted value to 0 each time the output of the differentiation circuit 3 goes high. The first register 5 holds the first value $N_i$ which is the counted value of the first counter 4 immediately after the output of the differentiation circuit 3 goes high (indicated as "H" in the figures), as a value corresponding to the vertical period of the input vertical sync signal $V_I$. The output of the mode discrimination circuit 6 becomes at a high level if the first value $N_i$ is not smaller than the predetermined lower-limit value $N_a$ and smaller than the predetermined upper-limit value $N_b$, and becomes at a low level (indicated as "L" in the figures) at the other times.

The timing signal generator 7 selects $N_i+N_j$ (namely, the value $N_i$ held in the first register 5 plus the permissible period fluctuation value $N_j$.) as the reference value $N_r$ while the output of the mode discrimination circuit 6 is at a high level, and selects $N_f$ (namely, the free-running period value) as the reference value $N_r$ while the output of the mode discrimination circuit 6 is at a low level.

Figure 2A:
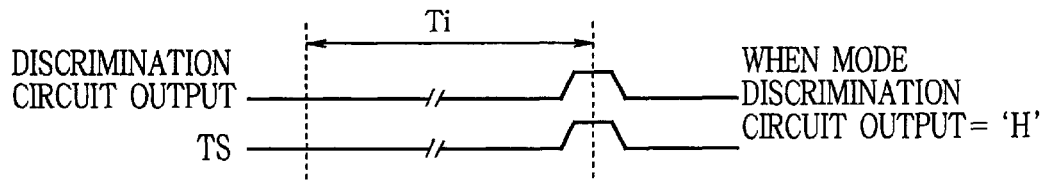
FIGS. 2A to 2E are diagrams showing the operation of a timing signal generator in the sync signal generator circuit of FIG. 1.
Figure 2B:
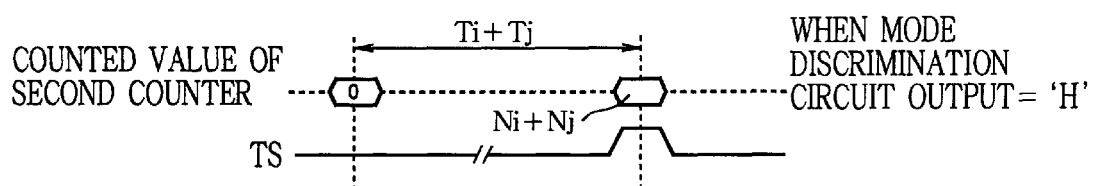
Figure 2C:
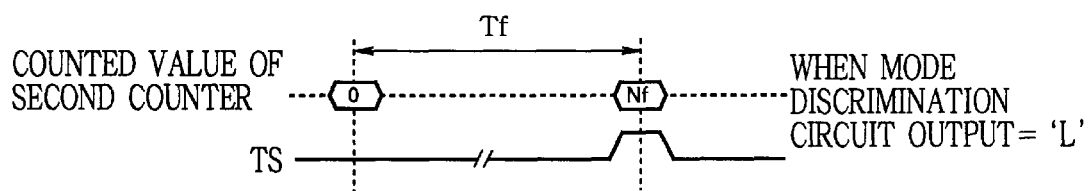

As shown in FIG. 2B, the timing signal generator 7 generates a timing pulse TS when the counted value N of the second counter 10 matches the reference value $N_r$ (=$N_i+N_j$) while the output of the mode discrimination circuit 6 is at a high level. Further, as shown in FIG. 2E, the timing signal generator 7 generates a timing pulse TS when the counted value N of the second counter 10 matches $N_o+N_j$ (namely, the second value $N_o$ held in the second register 11 plus the permissible period fluctuation value $N_j$).

Figure 2D:
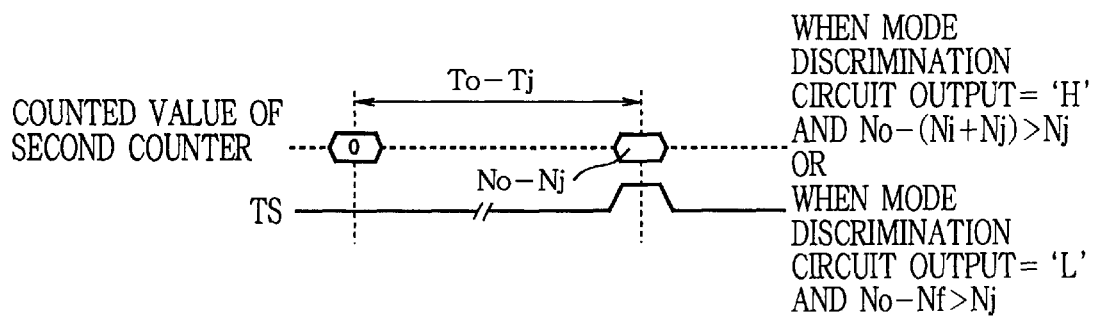
Figure 2E:
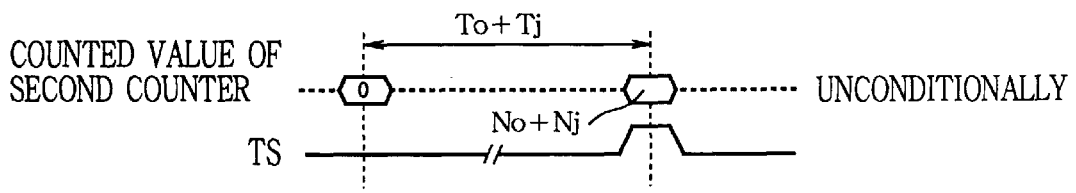

As shown in FIG. 2D, if the output of the mode discrimination circuit 6 is at a high level, the timing signal generator 7 generates a timing pulse TS also when the counted value N of the second counter 10 matches $N_o-N_j$ while $N_o-(N_i+N_j)>N_j$ (namely, the difference $\{N_o-(N_i+N_j)\}$ between the second value $N_o$ held in the second register 11 and the reference value $N_r$ (=$N_i+N_j$) is greater than the permissible period fluctuation value $N_j$). As shown in FIG. 2D, if the output of the mode discrimination circuit 6 is at a low level, the timing signal generator 7 generates a timing pulse TS also when the counted value N of the second counter 10 matches $N_{o-Nj}$ while $N_o-N_f>N_j$ (namely, the value $N_o-N_f$ is greater than the permissible period fluctuation value $N_j$).

Further, as shown in FIG. 2A, the timing signal generator 7 generates a timing pulse TS also when the output of the differentiation circuit 3 goes high while the output of the mode discrimination circuit 6 is at a high level.

Furthermore, as shown in FIG. 2B, the timing signal generator 7 generates a timing pulse TS also when the counted value N of the second counter 10 matches the free-running period value $N_f$ while the output of the mode discrimination circuit 6 is at a low level.

The gate signal generator 8 generates the gate signal GS which rises when the counted value N of the second counter 10 matches $N_o-N_j$ and falls when the gate circuit 9 outputs a reset pulse RS.

The gate circuit 9 closes the gate and inhibits passage of the timing pulse TS generated by the timing signal generator 7 while the gate signal GS outputted from the gate signal generator 8 is at a low level, and opens the gate and allows passage of the timing pulse TS while the gate signal GS is at a high level. The timing pulse TS passing the gate circuit 9 becomes the reset pulse RS of the second counter 10.

The second counter 10 resets the counted value to 0 each time the gate circuit 9 outputs the reset pulse RS. The second register 11 holds the second value $N_o$ which is the counted value of the second counter 10 when the gate circuit 9 generates the reset pulse RS, as a value corresponding to the period of the output vertical sync signal $V_o$. The sync pulse generator 12 outputs from the output terminal 13 a pulse that goes high when the counted value of the second counter 10 matches 0, as the output vertical sync signal $V_o$.

The vertical sync signal generator circuit configured as described above can be applied to a wide range of vertical period, and can reduce period fluctuations of the output vertical sync signal.

The gate signal GS generated by the gate signal generator 8 becomes in an open state after the counted value of the second counter 10 matches $N_{o-Nj}$. At least when the counted value of the second counter 10 matches $N_o+N_j$, the timing signal generator 7 generates the timing pulse TS. Therefore, the timing at which the reset pulse RS is generated must lie within the range of $N_o-N_j$ to $N_o+N_j$. The period of the reset pulses RS equals that of the vertical sync signal $V_o$ outputted from the output terminal 13. Accordingly, the period fluctuation of the vertical sync signal $V_o$ outputted from the output terminal 13 is always kept within the range corresponding to $-N_j$ to $N_j$. Because the permissible period fluctuation value $N_j$ is determined independently of the lower-limit value $N_a$ and the upper-limit value $N_b$, which determine the synchronization range, the synchronization range can be set to a given broad range while suppressing the period fluctuation of the output vertical sync signal $V_o$.

The timing at which the timing pulse TS is generated is determined both to suppress the period fluctuation of the output vertical sync signal $V_o$ and to follow the input vertical sync signal $V_I$ if the period of the input vertical sync signal $V_I$ is stable or otherwise to output the vertical sync signal $V_o$ having a stable free-running period.

With reference to FIGS. 2A to 2E, the operation of the timing signal generator 7 will be explained in further detail. FIGS. 2A to 2E also indicate the conditions in which each timing pulse TS is generated. In FIG. 2, symbols $T_j$, $T_f$, $T_i$ and $T_o$ denote periods that are determined by the values of control parameters $N_j$, $N_f$, $N_i$ and $N_o$ respectively. Further, the symbol $T_j$ denotes the permissible period fluctuation, $T_f$ denotes the free-running period, $T_i$ denotes the vertical period of the input vertical sync signal $V_I$, and $T_o$ denotes the vertical period of the output vertical sync signal $V_o$. The second counter 10 is reset when the first timing pulse TS generated while the gate signal GS is at a high level is received.

FIGS. 3A and 3B show the counted value of the second counter 10 when the reset pulse RS to reset the counted value of the second counter 10 is generated, depending on the second value $N_o$ held in the second register 11. FIGS. 3A and 3B show two cases, when the output of the mode discrimination circuit 6 is at a high level and is at a low level.

First, a case where the output of the mode discrimination circuit 6 is at a high level will be described, with reference to FIG. 3A. If the counted value of the second counter 10 is $N_o+N_j$ (a range of $N_o+N_j$ in the upper half of FIG. 3A) while the value $N_o$ corresponding to the vertical period of the output vertical sync signal $V_o$ is smaller than the value $N_i$ corresponding to the vertical period of the input vertical sync signal $V_I$ (a range up to $N_i$ in the lower half of FIG. 3A), the gate circuit 9 of the reset signal generator 35 outputs the reset pulse RS.

If the counted value of the second counter 10 is $N_i+N_j$ (a range of $N_i+N_j$ in the upper half of FIG. 3A) while the value $N_o$ corresponding to the vertical period of the output vertical sync signal $V_o$ is greater than or equal to the value $N_i$ of the vertical period $N_i$ of the input vertical sync signal $V_I$ and smaller than $N_i+2N_j$ (a range from $N_i$ to $N_i+2N_j$ in the lower half of FIG. 3A) the gate circuit 9 of the reset signal generator 35 outputs the reset pulse RS.

If the counted value of the second counter 10 is $N_o-N_j$ (a range of $N_o-N_j$ in the upper half of FIG. 3A) while the value $N_o$ corresponding to the vertical period of the output vertical sync signal $V_o$ is greater than or equal to $N_i+2N_j$ (a range of $N_i+2N_j$ and greater in the lower half of FIG. 3A), the gate circuit 9 of the reset signal generator 35 outputs the reset pulse RS. However, if the output of the differentiation circuit 3 triggers the earliest timing pulse TS, the output of the differentiation circuit 3 resets the second counter 10, irrespective of the value of $N_o$.

Next, a case where the output of the mode discrimination circuit 6 is at a low level will be described with reference to FIG. 3B. If the counted value of the second counter 10 is $N_o+N_j$ (a range of $N_o+N_j$ in the upper half of FIG. 3B) while the value $N_o$ corresponding to the vertical period of the output vertical sync signal $V_o$ is smaller than $N_f-N_j$ (a range smaller than $N_f-N_j$ in the lower half of FIG. 3B), the gate circuit 9 of the reset signal generator 35 outputs the reset pulse RS.

If the counted value of the second counter 10 is the free-running period value $N_f$ (a range of $N_f$ in the upper half of FIG. 3B) while a value $N_o$ corresponding to the vertical period of the output vertical sync signal $V_o$ is greater than or equal to $N_f-N_j$ and is smaller than $N_f+N_j$ (a range from $N_f-N_j$ to $N_f+N_j$ in the lower half of FIG. 3B), the gate circuit 9 in the reset signal generator 35 outputs the reset pulse RS.

If the counted value of the second counter 10 is $N_o-N_j$ (a range of $N_o-N_j$ in the upper half of FIG. 3B) while a value $N_o$ corresponding to the vertical period of the output vertical sync signal $V_o$ is greater than or equal to $N_f+N_j$ (a range greater than $N_f+N_j$ in the lower half of FIG. 3B), the gate circuit 9 in the reset signal generator 35 outputs the reset pulse RS.

The controls illustrated in FIGS. 3A and 3B indicate that the vertical period of the output vertical sync signal $V_o$ gradually approaches $T_i+T_j$ (namely, the vertical period of the input vertical sync signal plus permissible value) if the vertical period of the input vertical sync signal $V_I$ is within the synchronization range, and that the vertical period of the output vertical sync signal $V_o$ gradually approaches the free-running period $T_f$ if the synchronization range is exceeded.

Figure 4C:
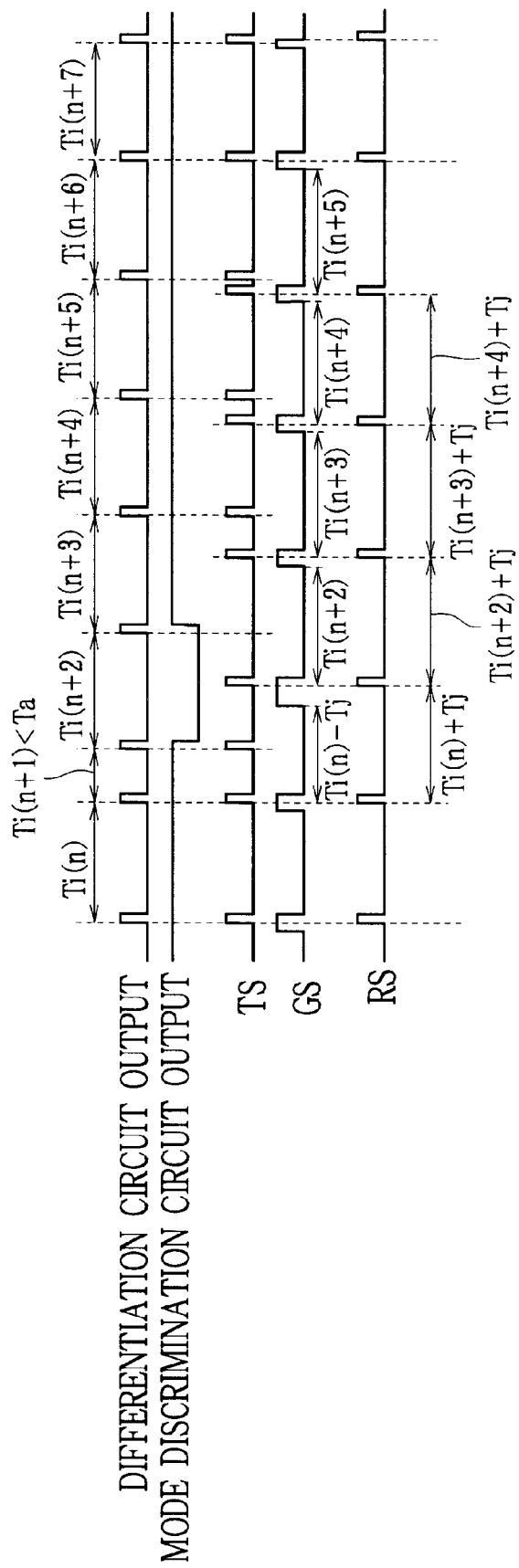

The fact that these features of control account for the generation of the vertical sync signal $V_o$ having a stable period will be described, with reference to the timing charts of FIGS. 4A to 4C. FIGS. 4A to 4C show the output of the differentiation circuit 3, the output of the mode discrimination circuit 6, the timing pulses TS generated by the timing signal generator 7, the gate signal GS generated by the gate signal generator 8, and the reset pulses RS generated by the gate circuit 9. The vertical sync signal $V_o$ outputted from the output terminal 13 is not shown because it has the same period as the reset pulse RS.

FIG. 4A shows a case where the free-running vertical sync signal $V_o$ with the constant period $T_f$ is generated when no sync signal $V_I$ is inputted to the input terminal 1, establishing the loss-of-signal state. The vertical period of the input sync signal at a given time is represented as $T_i$, and the value of the n-th field of the value varying with field is represented as $T_i(n)$. If the vertical sync signal $V_I$ of the n-th field enters the loss-of-signal state in the middle, the output of the mode discrimination circuit 6 goes low immediately after the upper-limit period $T_b$ of the synchronization range is exceeded after the last vertical sync signal $V_I$ is inputted, and the vertical period of the output sync signal is controlled to gradually approach the free-running period $T_f$. Here, $T_b$ is the time corresponding to the control parameter $N_b$ and denotes an upper-limit period of the synchronization range. If the free-running period $T_f$ is greater than $T_i(n)+3T_j$ and does not exceed $T_i(n)+4T_j$, the vertical period of the output sync signal matches the free-running period $T_f$ four fields after the vertical sync signal $V_o$ of which vertical period is $T_i(n)$ is outputted, as shown in the figure, and then, the output of the vertical sync signal $V_o$ having the constant period $T_f$ continues as long as the loss-of-signal state remains.

FIG. 4B shows a case where any loss of input vertical sync signal $V_I$ is interpolated. If the period of the vertical sync signal $V_I$ inputted last is $T_i(n)$, interpolation is performed at the timing of $T_i(n)+T_j$, and if a vertical sync signal is further inputted virtually vertical period $T_i(n)$ later, the input and output sync signals are brought into synchronization immediately.

FIG. 4C shows a case where if a vertical sync signal having too short period is temporarily inputted, the input and output vertical sync signals are synchronized again while suppressing the period fluctuations, thereby making the period of the output sync signal within the permissible range. A vertical period of the input vertical sync signal at a given time is expressed as $T_i(n)$, and suppose that the period $T_i(n+1)$ of the vertical sync signal inputted next is shorter than the lower-limit period $T_a$ of the synchronization range, where the lower-limit period $T_a$ is a time corresponding to the control parameter $N_a$. Here, the output of the mode discrimination circuit 6 goes low immediately after a vertical period shorter than the lower-limit period $T_a$ is detected, bringing the vertical period of the output closer to the free-running period $T_f$. If the vertical period $T_i(n+2)$ is within the synchronization range between the lower-limit period $T_a$ and the upper-limit period $T_b$, the output of the mode discrimination circuit 6 goes high again, here bringing the vertical period of the output sync signal to a period which is longer than the vertical period of the input sync signal by the permissible period $T_j$ of fluctuation. If all the vertical periods of the input vertical sync signal except the one of the (n+1)-th field are substantially the same, the vertical period of the output vertical sync signal changes as shown in the figure, and the output signal of the differentiation circuit 3 that was originally blocked by the gate signal GS appears after an appropriate period in the period unblocked by the gate signal GS, establishing the synchronization between the input and output vertical sync signals. Here, in the synchronizing process in which the input and output vertical sync signals are synchronized again, the output vertical sync signal always has a period longer than that of the input vertical sync signal by the permissible period $T_j$, so that the time needed for the synchronizing process is, at most, about the square of the input period divided by the permissible period $T_j$, and the synchronizing process will not be extremely long if the value of $N_j$ is appropriately specified.

As has been described above, the sync signal generator circuit according to the first embodiment can provide a vertical sync signal having a stable period and can be applied to a wide range of the period of the vertical sync signal. Further, when the unstable period of the input vertical sync signal becomes stable, the output vertical sync signal $V_o$ can be brought into synchronization with the input vertical sync signal $V_I$ within a relatively short period.

In the above description of the first embodiment, the mode discrimination circuit 6 makes a determination on the basis of the lower-limit value $N_a$ and the upper-limit value $N_b$ of the synchronization range, but the present invention is not limited to the described example. The mode discrimination circuit 6 may, for instance, use the output value of the first register 5 and the permissible value $N_j$ and set the condition of bringing the output of the mode discrimination circuit 6 high as being greater than or equal to $N_i-N_j$ and smaller than or equal to $N_i+N_j$. The condition of bringing the output of the mode discrimination circuit 6 high may also be set as being greater than or equal to the lower-limit value $N_a$ and smaller than the upper-limit value $N_b$ and greater than or equal to $N_i-N_j$ and smaller than or equal to $N_i+N_j$.

Furthermore, if required, a period change larger than the permissible period $T_j$ (corresponding the permissible value $N_j$) may be exceptionally allowed not to output any vertical period during a part of the synchronization range determined by the lower-limit value $N_a$ and the upper-limit value $N_b$, and this will not impair the features of the present invention.

Second Embodiment

The first embodiment relates to a sync signal generator circuit which can be applied to a wide range of vertical period by setting a wide synchronization range. In contrast with the first embodiment, the second embodiment relates to a sync signal generator circuit which can be applied to a wide range of vertical period by keeping a narrow synchronization range and adjusting the synchronization range in accordance with the measurement result of the vertical period of the input vertical sync signal. Since the input vertical sync signal generally has a constant period, it is preferable in some cases that the synchronization range is kept narrow for the purpose of preventing an output vertical sync signal based on a noise signal from being generated, for instance.

Figure 5:
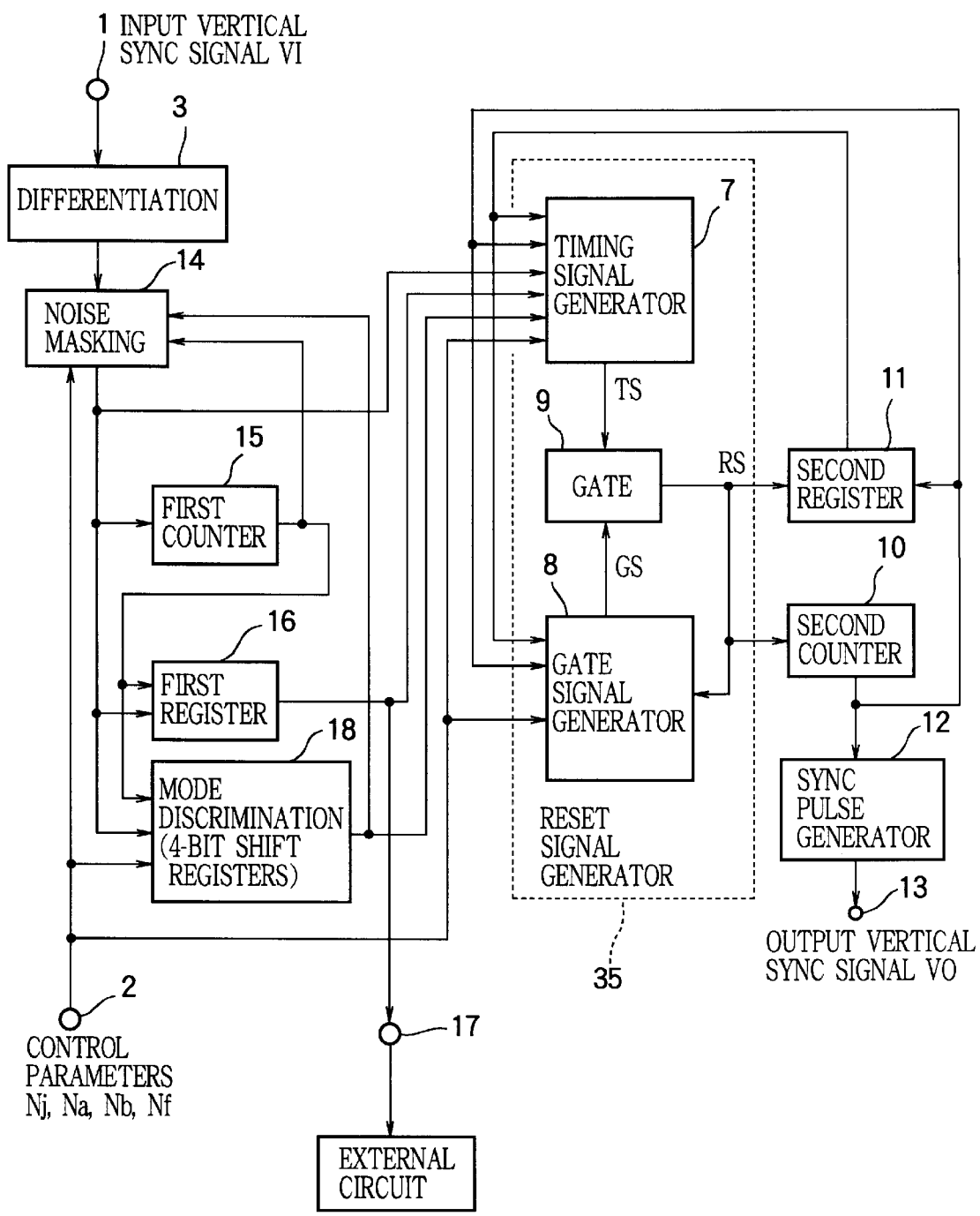
FIG. 5 is a block diagram showing a configuration of a sync signal generator circuit according to a second embodiment of the present invention.

FIG. 5 is a block diagram showing a configuration of the sync signal generator circuit according to the second embodiment of the present invention. Those elements in FIG. 5 that are identical to or correspond to elements in FIG. 1 are assigned identical symbols.

In FIG. 5, a reference numeral 14 denotes a noise masking circuit, 15 denotes a first counter, 16 denotes a first register, 17 denotes a terminal, and 18 denotes a mode discrimination circuit. The noise masking circuit 14 determines whether or not it allows passage of the output of the differentiation circuit 3, on the basis of the two control parameters, the upper-limit value $N_b$ and the lower-limit value $N_a$ of the synchronization range, inputted to the terminal 2, the counted value of the first counter 15, and the output of the mode discrimination circuit 18. The first counter 15 resets the counted value to 0 each time the output of the noise masking circuit 14 goes high. The first counter 15, however, resets the counted value to a value corresponding to a difference between the upper-limit value $N_b$ and the free-running period value $N_f$ when the counted value of the first counter 15 matches the upper-limit value $N_b$. The first register 16 holds the periods of the input vertical sync signals of the past four fields. From the terminal 17, the periods of the input vertical sync signals of the past four fields held in the first register 16 are outputted. The mode discrimination circuit 18 judges whether or not the periods of the input vertical sync signals of the past four fields are within the synchronization range. The second embodiment is the same as the first embodiment except for the respects described above.

Next, the part of operation different from that of the first embodiment will be described in detail. The noise masking circuit 14 allows passage of the output of the differentiation circuit 3 if the output of the mode discrimination circuit 18 is at a low level or if the counted value of the first counter 15 is not smaller than the lower-limit value $N_a$ of the synchronization range and is smaller than the upper-limit value $N_b$ of the synchronization range. The noise masking circuit 14 inhibits passage of the output of the differentiation circuit 3 at the other times.

The first register 16 holds the periods of the input vertical sync signals of the past four fields, assuming the counted value of the first counter 15 when the output of the noise masking circuit 14 goes high as a value corresponding to the period of the input vertical sync signal. The first register 16 outputs just the vertical period measured last out of the values held in it, to the timing signal generator 7. From the terminal 17, the periods of the input vertical sync signals of the past four fields are outputted. On the basis of the value, an external circuit changes the values of three parameters $N_a$, $N_b$ and $N_f$, which are control parameters inputted to the terminal 2 together with $N_j$. The method of determining the values of $N_a$, $N_b$ and $N_f$ will be described later.

The mode discrimination circuit 18 comprises four-bit shift registers. The mode discrimination circuit 18 makes the level of the first-stage register high if the counted value of the first counter 15 when the output of the noise masking circuit 14 goes high is within the synchronization range, and makes the level of the first-stage register low at the other times. When a value is set in the first-stage register, the mode discrimination circuit 18 shifts the register value of each stage to the next stage. The output of the mode discrimination circuit 18 is at a high level if all the register values of the four-bit shift register are high, low if all the values are low, and is kept the previous output value at the other times.

The vertical sync signal generator circuit configured as described above can generate a sync signal having a stable period by suppressing the effect of noise and the like.

To eliminate noise effectively, the values of control parameters $N_a$ and $N_b$ that determine the operation of the noise masking circuit 14 are important. In the second embodiment, first, an average of the vertical periods of the input vertical sync signals of the past four fields outputted from the terminal 17 is obtained, and if the average is within the range determined by the lower-limit value $N_c$ and the upper-limit value $N_d$, the value $N_f$ is set to the average, the value $N_a$ is set to a value a little smaller than the value $N_f$, and the value $N_b$ is set to a value a little greater than the value $N_f$. If the average is not within the range described above, the previous values of $N_f$, $N_a$ and $N_b$ are held. However, the method of determining $N_a$, $N_b$ and $N_f$ is not limited to the one described here and may be another method.

If the counted value of the first counter 15 is smaller than the lower-limit value $N_a$ or not smaller than the upper-limit value $N_b$, the noise masking circuit 14 inhibits passage of the output of the differentiation circuit 3 assuming it to be noise even when the output of the differentiation circuit 3 goes high. Because the values $N_a$ and $N_b$ are determined on the basis of the vertical period of the input vertical sync signal, if the vertical period of the input vertical sync signal is stable, there is little possibility that the noise masking circuit 14 misconstrues the original vertical sync signal $V_I$ inputted to the input terminal 1 as noise. Values $N_c$ and $N_d$ mentioned earlier are parameters that have almost the same meanings as the values $N_a$ and $N_b$ in the first embodiment, and if the vertical period of the input vertical sync signal is within the range determined by the values $N_c$ and $N_d$, the vertical period of the output vertical sync signal can be brought closer to it.

The operation of the sync signal generator circuit according to the second embodiment will next be described. FIG. 6A shows a case where any noise overlaid on the vertical sync signal $V_I$ inputted to the input terminal 1 is eliminated to generate a vertical sync signal having a stable period. As described earlier, the noise masking circuit 14 eliminates apart of the output of the differentiation circuit 3 having a period smaller than the lower-limit period $T_a$ or not smaller than the upper-limit period $T_b$, so that the timing signal generator 7 and the mode discrimination circuit 18 can steadily operate, without being affected by noise.

FIG. 6B shows a case where if the period of the input vertical sync signal $V_I$ changes, the period of the output vertical sync signal is brought closer to the period of the input vertical sync signal while suppressing period fluctuations. Suppose that the period of the input vertical sync signal changes from $T_{i1}$ to $T_{i2}$ at a given instant. If the period $T_{i2}$ is shorter than the lower-limit period $T_a$ determined on the basis of the period $T_{i1}$, the vertical sync signal that is originally inputted at intervals of $T_{i2}$ is blocked by the noise masking circuit 14. However, after a period corresponding to $3T_f+T_b$, where $T_f$ is the free-running period determined according to the period $T_{i1}$, and $T_b$ is the upper-limit period, has elapsed, all the register values of the four-bit shift register of the mode discrimination circuit 18 become low, bringing the output of the mode discrimination circuit 18 low and causing the noise masking circuit 14 to unconditionally pass the output of the differentiation circuit 3. When the output of the mode discrimination circuit 18 goes low, the timing signal generator 7 ignores the output of the differentiation circuit 3 and generates the timing pulse TS at intervals of the free-running period $T_f$, which is equal to the period $T_{i1}$. Moreover, if the noise masking circuit 14 allows passage of the output of the differentiation circuit 3 having the period $T_{i2}$, the period $T_{i2}$ is held in the first register 16, so that the average of the vertical periods of the input vertical sync signals of the past four fields gradually changes from $T_{i1}$ to a value close to $T_{i2}$. In response to the change, the values of $T_a$, $T_b$ and $T_f$ gradually change to a value close to $T_{i2}$. In this way, as shown in the figure, for instance, the vertical period of the output vertical sync signal is reduced by the permissible period $T_j$ in each field through the operation of the timing signal generator 7, as described for the first embodiment, and is gradually brought to $T_{i2}+T_j$ finally. If the vertical period of the output vertical sync signal is brought to $T_{i2}+T_j$ after an appropriate period has elapsed, the synchronizing process to synchronize the input and output vertical sync signals starts next, which is not shown. The time needed to change the vertical period of the output sync signal from $T_{i2}$ to $T_{i1}+T_j$ substantially corresponds to a difference between $T_{i1}$ and $T_{i2}$ divided by the permissible period $T_j$ and multiplied by an average of $T_{i1}$ and $T_{i2}$. The permissible value $N_j$ is determined independently of the lower-limit value $N_a$ and the upper-limit value $N_b$, which determine the synchronization range, so that if the permissible value $N_j$ is increased to speed up the change of the period, the synchronization range can be kept within a given narrow range.

Figure 6C:
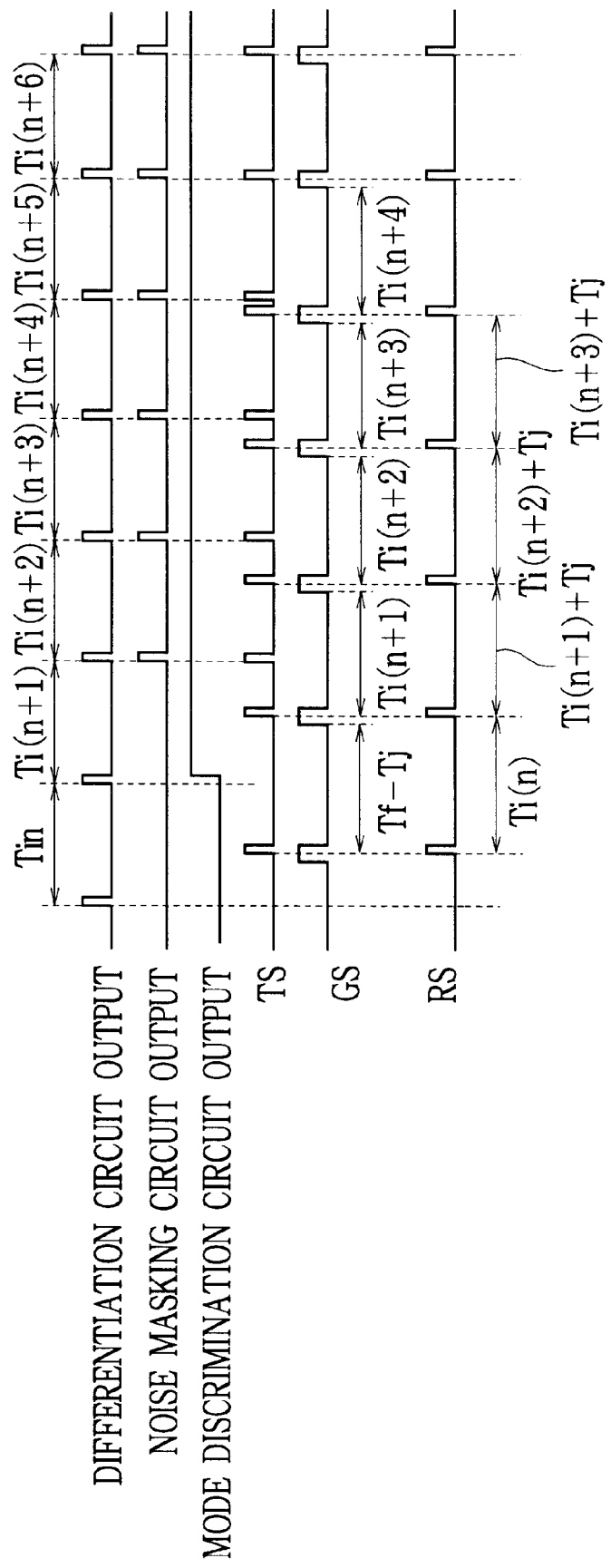

FIG. 6C shows a case where the input and output vertical sync signals are synchronized again in the synchronizing process. If the output of the mode discrimination circuit 18 goes high at the instant when the period of the input vertical sync signal and the period of the output vertical sync signal become almost the same, the output period changes from the free-running period $T_f$ to a period longer than the input period by the permissible period $T_j$, and the synchronizing process starts. After this, the same process as that described for the first embodiment with reference to FIG. 4C is followed to synchronize the input and output vertical sync signals. Here, the time required for the synchronizing process is also a period substantially corresponding to the square of the period of the input vertical sync signal divided by the permissible period $T_j$, at most. Because the permissible value $N_j$ is determined independently of the lower-limit value $N_a$ and the upper-limit value $N_b$ of the synchronization range, if the permissible value $N_j$ is increased to speed up the synchronizing process, the synchronization range can be kept a given narrow range.

As has been described above, the sync signal generator circuit according to the second embodiment can keep the period of the output vertical sync signal within a narrow synchronization range while the period of the input vertical sync signal is stable, by setting a narrow synchronization range and a relatively wide range of permissible period fluctuations. Further, the sync signal generator circuit can quickly synchronize the input and output vertical sync signals if the period of the input vertical sync signal changes or if the period of the input vertical sync signal is temporarily disturbed, for instance.

In the second embodiment, the permissible range of period fluctuations is set to a certain range from $-T_j$ to $T_j$, independently of the vertical period of the input vertical sync signal, but the permissible range of period fluctuations may be changed in accordance with the vertical period of the input vertical sync signal if necessary. For instance, if $N_j$ is set to a value proportional to the square of the vertical period of the input vertical sync signal, the period of synchronizing process can be suppressed to a certain period, irrespective of the vertical period of the input vertical sync signal.

Third Embodiment

Figure 7:
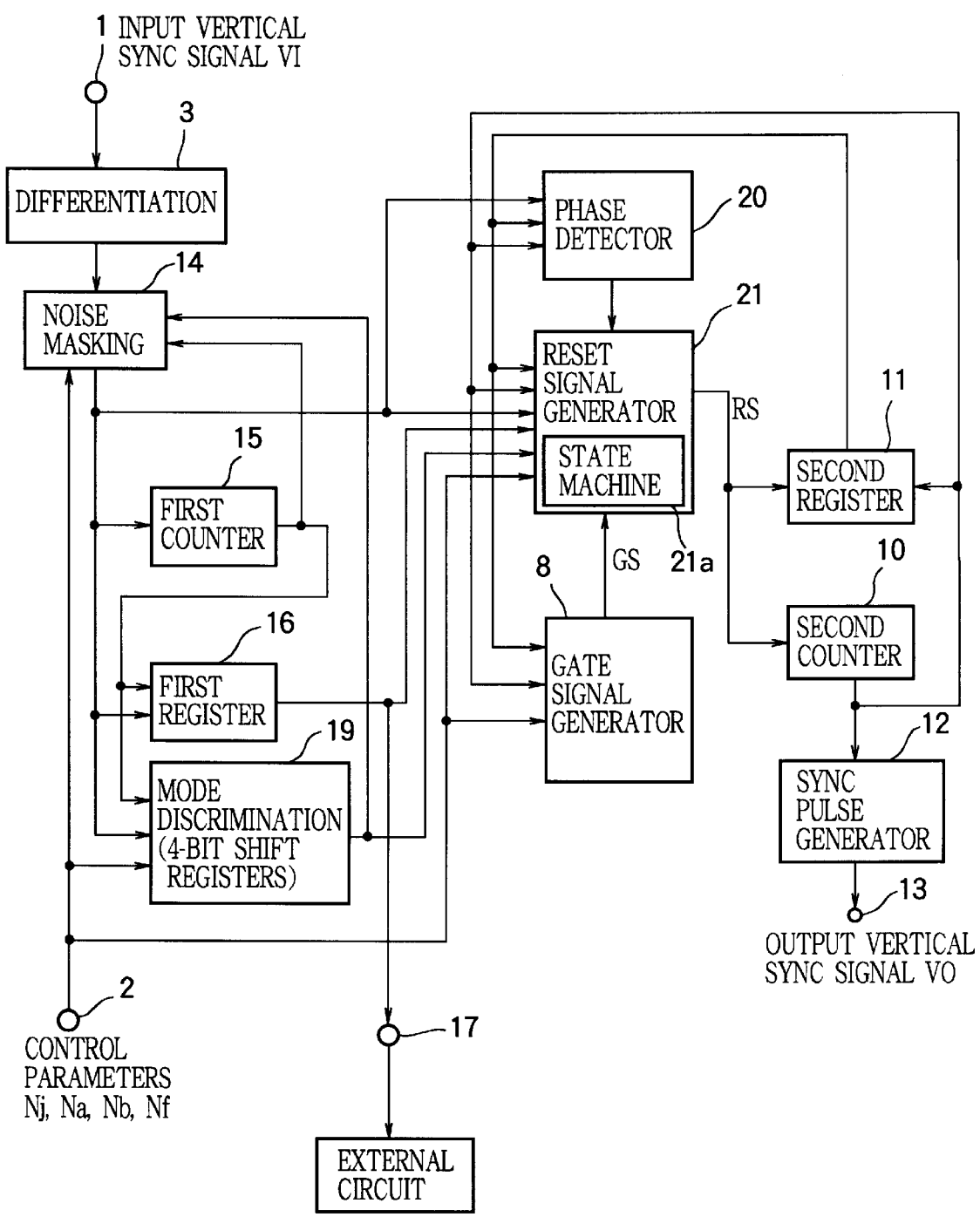
FIG. 7 is a block diagram showing a configuration of a sync signal generator circuit according to a third embodiment of the present invention.

The third embodiment relates to a sync signal generator circuit including a state machine. The sync signal generator circuit can generate an output vertical sync signal having an appropriate period in accordance with the state of the input vertical sync signal using the state machine. FIG. 7 is a block diagram showing a configuration of the sync signal generator circuit according to the third embodiment of the present invention. Those elements in FIG. 7 that are identical to or correspond to elements in FIG. 5 are assigned identical symbols.

In FIG. 7, a reference numeral 19 denotes a mode discrimination circuit, 20 denotes a phase detector, and 21 denotes a reset signal generator. The mode discrimination circuit 19 judges whether a period of the input vertical sync signal $V_I$ is within the synchronization range on the basis of the lower-limit value $N_a$ and the upper-limit value $N_b$ of the synchronization range inputted to the terminal 2, the output of the noise masking circuit 14, and the output of the first counter 15. The phase detector 20 detects a phase difference between the input vertical sync signal $V_I$ and the output vertical sync signal $V_o$ on the basis of the outputs of the noise masking circuit 14, the second counter 10, and the second register 11. The reset signal generator 21 contains a state machine 21a which changes its state on the basis of the outputs of the mode discrimination circuit 19, the noise masking circuit 14, the gate signal generator 8, and the phase detector 20. The reset signal generator 21 generates reset pulses RS to reset the second counter 10 on the basis of the state of the state machine 21a, the output of the noise masking circuit 14, the output of the gate signal generator 8, the four control parameters $N_j$, $N_a$, $N_b$, and $N_f$ inputted to the terminal 2, the period of the input vertical sync signal $V_I$ (namely, a first value $N_i$ held in the first register 16), the period of the output vertical sync signal $V_o$ (a second value $N_o$ held in the second register 11), and the counted value of the second counter 10.

The mode discrimination circuit 19 contains a four-bit shift register as in the case of the second embodiment. The shift register is different from that in the second embodiment just in that the output goes low when the register values of the first and next stages become low, goes high when all the register values become high, and is kept the immediately preceding value at the other times. Accordingly, the output of the mode discrimination circuit 19 goes low if the period of the input vertical sync signal in the past two fields are beyond the synchronization range, and goes high if the periods of the input vertical sync signals in the past four fields are within the synchronization range.

The phase detector 20 judges whether the phase of the output vertical sync signal $V_o$ leads or lags behind with respect to the phase of the input vertical sync signal $V_I$. The output of the phase detector 20 goes high if the counted value of the second counter 10 is greater than a half of the period of the output vertical sync signal held in the second register 11 while the output of the noise masking circuit 14 is at a high level, and goes low at the other times. The output of the phase detector 20 is updated each time the counted value of the second counter 10 is reset to 0. The high level output of the phase detector 20 indicates that the phase of the output vertical sync signal $V_o$ lags behind with respect to the phase of the input vertical sync signal $V_I$. The low level output of the phase detector 20 indicates that the phase of the output vertical sync signal $V_o$. leads with respect to the phase of the input vertical sync signal $V_I$ or that no input sync signal $V_I$ is detected.

Figure 8:
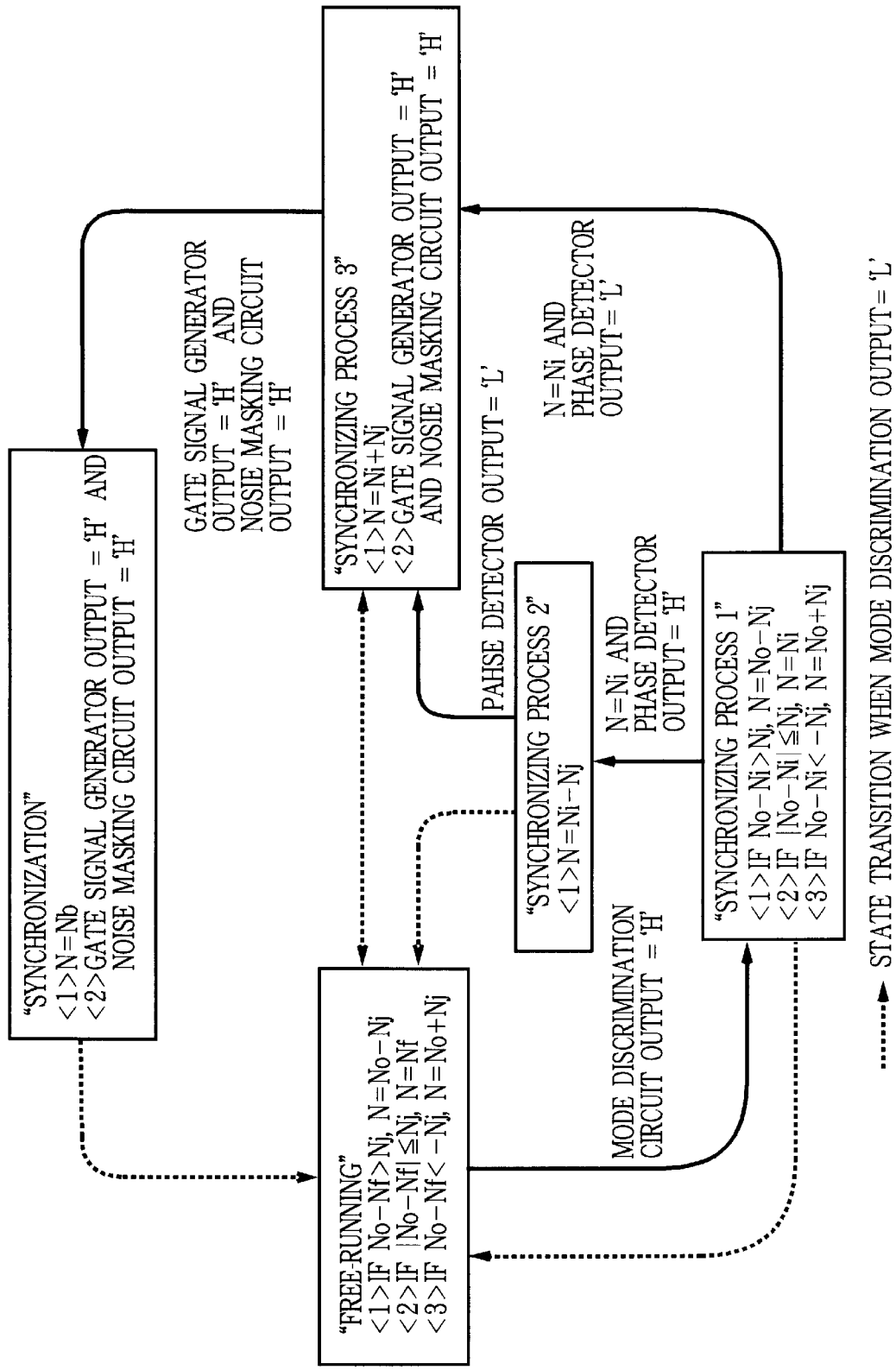
FIG. 8 is a state transition diagram showing the operation of a state machine in the sync signal generator circuit of FIG. 7.

FIG. 8 is a state transition diagram of the state machine 21a in the reset signal generator 21. As shown in the figure, the state machine 21a has five states "Synchronization", "Free-Running", "Synchronizing Process 1", "Synchronizing Process 2", and "Synchronizing Process 3". The reset signal generator 21 controls the timing at which the reset pulse RS is outputted in accordance with the state of the state machine 21a. In the figure, N denotes the counted value of the second counter 10 when the reset pulse RS is generated.

While the state machine 21a is in the state of "Synchronization", the reset signal generator 21 generates the reset pulse RS, <1> if the counted value N of the second counter 10 equals the upper-limit value $N_b$ of the synchronization range, or <2> if the output of the gate signal generator 8 is at a high level and the output of the noise masking circuit 14 is at a high level.

Further, while the state machine 21a is in the state of "Free-Running", the reset signal generator 21 generates the reset pulse RS, <1> when the counted value N of the second counter 10 is $N_o - N_f$ the difference between the counted value $N_o$ held in the second register 11 and the free-running period value $N_f$ is greater than the permissible period fluctuation value $N_j$, <2> when the counted value N of the second counter 10 is the free-running period value $N_f$ if the absolute value of the difference between the counted value $N_o$ and the free-running period value $N_f$ is not greater than the permissible period fluctuation value $N_j$, or <3> when the counted value N of the second counter 10 is $N_o+N_j$ if the counted value $N_o$ minus the free-running period value $N_f$ is smaller than $-N_o$.

Furthermore, while the state machine 21a is in the state of "Synchronizing Process 1", the reset signal generator 21 generates the reset pulse RS, <1> when the counted value N of the second counter 10 is $N_o-N_j$ if $N_{o-Ni}>N_j$, <2> when the counted value N of the second counter 10 is $N_j$ if $|N_o-|\leq N_j$, or <3> when the counted value N of the second counter 10 is $N_o+N_j$ if $N_o-N_i<N_j$.

Moreover, while the state machine 21a is in the state of "Synchronizing Process 2", the reset signal generator 21 generates the reset pulse RS, <1> when the counted value N of the second counter 10 is $N_o-N_j$.

In addition, while the state machine 21a is in the state of "Synchronizing Process 3", the reset signal generator 21 generates the reset pulse RS, <1> when the counted value N of the second counter 10 is $N_i+N_j$, or <2> when the output of the gate signal generator 8 is at a high level and the output of the noise masking circuit 14 is at a high level.

FIG. 8 also indicates the conditions of state transitions of the state machine 21a. For instance, if the current state is "Synchronization", the state changes to "Free-Running" when the output signal of the mode discrimination circuit 19 goes low as indicated in FIG. 8 and remains in the state of "Synchronization" at the other conditions, which is not especially indicated in FIG. 8.

Further, if the current state is "Free-Running", the state changes to the state of "Synchronizing Process 1" when the output signal of the mode discrimination circuit 19 goes high, and remains in the state of "Free-Running" at the other conditions.

Furthermore, if the current state is "Synchronizing Process 1", the state changes to "Free-Running" when the output of the mode discrimination circuit 19 goes low. In the state of "Synchronizing Process 1", if the counted value N of the second counter 10 equals the first value $N_i$ and the output of the phase detector 20 goes high, the state changes to "Synchronizing Process 2". In the state of "Synchronizing Process 1", if the counted value N of the second counter 10 equals $N_i$ and the output of the phase detector 20 goes low, the state changes to "Synchronizing Process 3". In "Synchronizing Process 1", at the other conditions, the state remains in "Synchronizing Process 1". The transition from "Synchronizing Process 1" to "Free-Running" has a higher priority than any other transitions. Even if the reset pulse RS is generated when the counted value N of the second counter 10 equals the first value $N_i$, the transition to the state of "Free-Running" occurs as long as the output signal of the mode discrimination circuit 19 is at a low level. The transitions indicated by dotted lines have a higher priority even if the condition of transition to another state is satisfied at the same time. The state transitions from the state of "Synchronizing Process 2" or "Synchronizing Process 3" are also as indicated in the figure. The state transition of the state machine 21a basically occurs at clock intervals, but while the output of the gate signal generator 8 is at a high level, state transitions except the transition from "Synchronizing Process 3" to "Free-Running" are prohibited to avoid a malfunction.

Figure 9A:
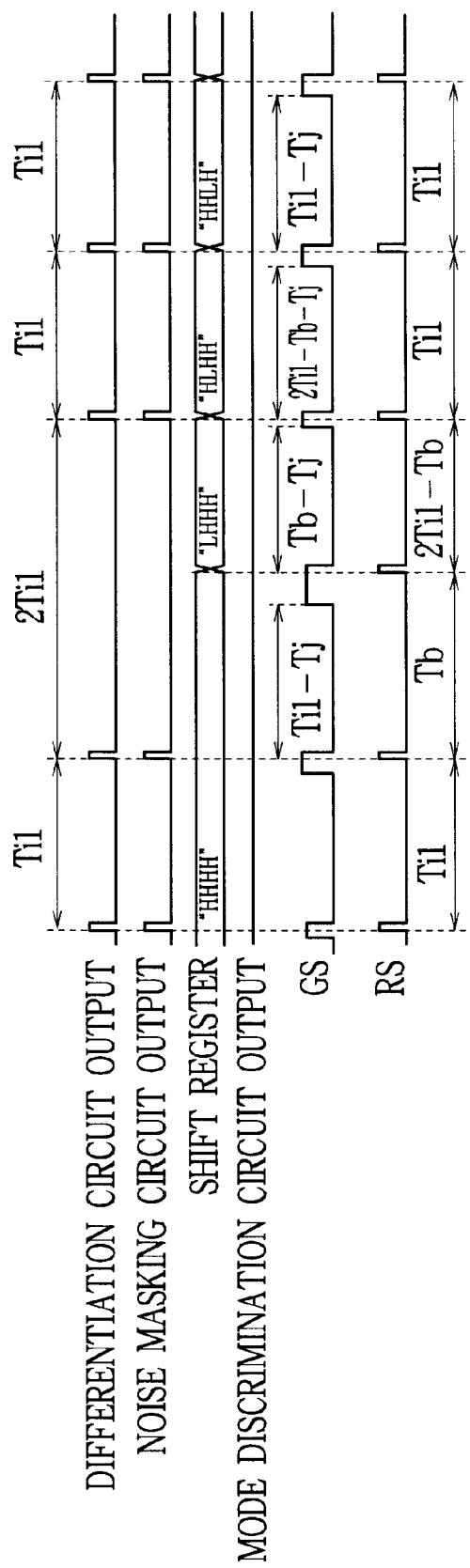
Figure 11A:
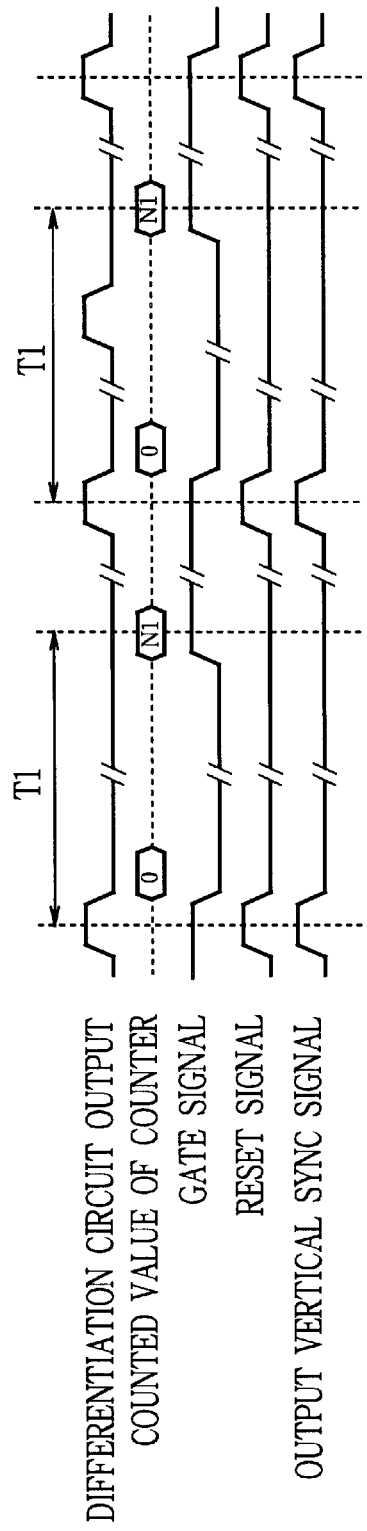
FIGS. 11A to 11D are timing charts showing the operation of the prior art sync signal generator circuit of FIG. 10.
Figure 11B:
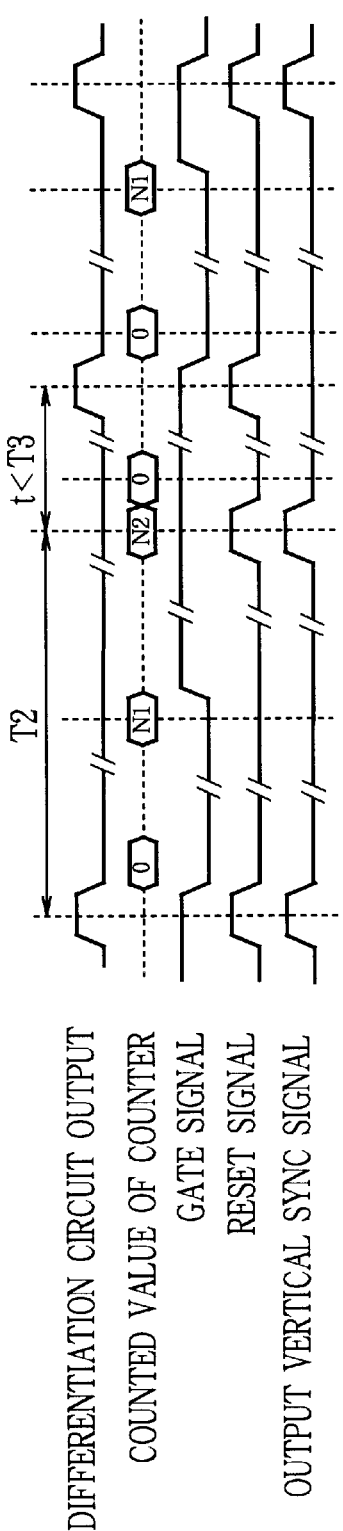
Figure 11C:
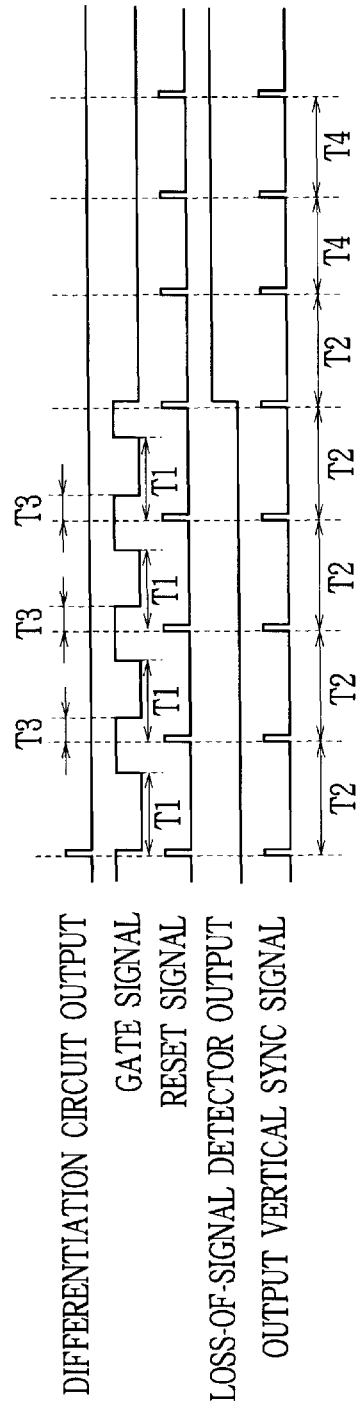
Figure 11D:
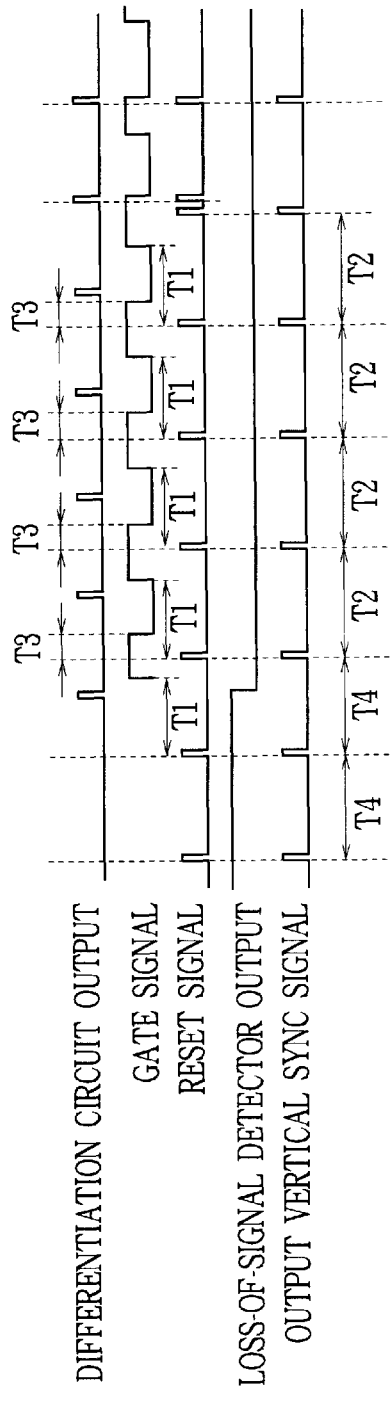

The sync signal generator circuit configured as described above can generate a vertical sync signal having an appropriate period in accordance with the current state of the state machine 21a. First, if the current state is "Synchronization", the reset pulse RS is generated when the outputs of both the noise masking circuit 14 and the gate signal generator 8 become at a high level or when the counted value N of the second counter 10 equals the upper-limit value $N_b$. If the difference between the lower-limit value $N_a$ and the upper-limit value $N_b$ is set to a value sufficiently smaller than $N_j$, the loss of the input vertical sync signal $V_I$ can be interpolated by the upper-limit value $N_b$ with less period fluctuations, not by $N_i+N_j$, as shown in FIG. 4B for the first embodiment. Accordingly, the period fluctuations when the input vertical sync signal $V_I$ is lost can be suppressed, and the synchronization to the input vertical sync signal inputted to the input terminal 1 after the interpolation can also be facilitated. The state is illustrated in FIG. 9A. FIGS. 9A and 9B also show sample values of the four-bit shift register included in the mode discrimination circuit 19.

When the period of the input vertical sync signal $V_I$ is inputted at constant intervals of $T_{i1}$ and the current state is "Synchronization", the input vertical sync signal is lost, thereby changing the apparent period to twice as long as $T_{i1}$. A period $T_b$ after the last input of the vertical sync signal $V_I$, the first-stage register value of the four-bit shift register contained in the mode discrimination circuit 19 goes low, and at the same time, the vertical sync signal (the third pulse from left side in FIG. 9A) is interpolated. Here, as described in the second embodiment, the first counter 15 is reset to a value corresponding to the difference between the upper-limit value $N_b$ and the free-running period value $N_f$, so that the reference edge of the vertical sync signal inputted $2T_{i1}$ later is detected while the counted value of the first counter 15 is between the lower-limit value $N_a$ and the upper-limit value $N_b$, thereby bringing the first-stage register value high again. Accordingly, both of the first-stage and second-stage register values do not become low at the same time, so that no state transition will occur, retaining the current state of "Synchronization". Therefore, if the difference between the upper-limit value $N_b$ and the free-running period value $N_f$ is set to a value smaller than $N_j$, the vertical sync signal synchronized with the input vertical sync signal, which appears $2T_{i1}$ later as the output vertical sync signal immediately after the interpolation, can be obtained. Because the interpolation timing of the first embodiment is $T_{i1}+T_j$, the vertical period of the next output cannot be set to $T_{i1}-T_j$ because of the constraints of the amount of period fluctuation, and the output vertical sync signal cannot be synchronized with the input vertical sync signal appearing $2T_{i1}$ later.

FIG. 9B shows a case where the period of the output vertical sync signal is brought to the period of the input vertical sync signal again when the vertical sync signal $V_I$ which was inputted at constant intervals of $T_{i1}$ is temporarily given a period shorter than the lower-limit period $T_a$ of the synchronization range during the current state of "Synchronization". The figure also shows the output of the phase detector 20 and the current state of the state machine 21a included in the reset signal generator 21. If a vertical sync signal of which period t is shorter than the lower-limit period $T_a$ is inputted at a given instant, the vertical sync signal $V_I$ inputted to the input terminal 1 after the vertical period $T_{i1}$ will not appear while the counted value of the first counter 15 is somewhere between the lower-limit value $N_a$ and the upper-limit value $N_b$, depending on the period t, and the output is blocked by the noise masking circuit 14. In this case, the output of the mode discrimination circuit 17 goes low $T_f+T_b$ after the last output of the differentiation circuit 3 passes the noise masking circuit 14, and at the same time, the state changes from "Synchronization" to "Free-Running". Meanwhile, the noise masking circuit 14 unconditionally allows passage of the output of the differentiation circuit 3, and when the average of the vertical periods of the input vertical sync signals outputted from the output terminal 17 substantially matches the vertical period $T_{i1}$ after a certain period has elapsed, the output of the mode discrimination circuit goes high. Here, the state changes from "Free-Running" to "Synchronizing Process 1". In the figure, a part of the period in which the state is "Free-Running" is omitted. If the difference between the free-running period $T_f$ and the vertical period $T_{i1}$ is smaller than the permissible period $T_j$, "Synchronizing Process 1" immediately ends, and the state changes to "Synchronizing Process 2" or "Synchronizing Process 3". Meanwhile, if the output vertical sync signal lags behind the input vertical sync signal, as shown in FIG. 9B and if the output of the phase detector 20 is at a high level, the state changes from "Synchronizing Process 3" to "Synchronizing Process 2". In the state of "Synchronizing Process 2", because the vertical period of the output vertical sync signal is shorter than the vertical period of the input vertical sync signal by the permissible period $T_j$, the phase lag of the output gradually decreases, bringing the output of the phase detector 20 low in the course of time and changing the state to "Synchronizing Process 3". Because the phase lead of the output is very small when the state changes from "Synchronizing Process 2" to "Synchronizing Process 3", the output of the noise masking circuit 14 will soon appear in the period unblocked by the gate signal generator 8, which returns the state to "Synchronization" and establishes "Synchronization" between the input and output sync signals again. In the synchronizing process in which the input and output vertical sync signals are synchronized, the phase difference between the input and output vertical sync signals is referenced, so that a period virtually corresponding to the square of the input period divided by twice the permissible period $T_j$ is needed at most between the beginning of "Synchronizing Process 3" and a return to the state of "Synchronization", and the synchronizing process can be sped up about twice in comparison with that in the first embodiment or the second embodiment.

By determining the vertical period depending on the state through the use of the state machine 21a as described above, the period fluctuations of the input sync signal while the input and output vertical sync signals are synchronized can be suppressed low, and the synchronizing process can be sped up, for instance, so that a more stable vertical sync signal can be obtained.

The example described as the third embodiment generates the reset pulse RS when the counted value of the second counter 10 matches the upper-limit value $N_b$ in the state of "Synchronization", but the upper-limit value $N_b$ may be replaced by a value corresponding to a period a little longer than the period of the input sync signal.

For the first to third embodiments, the vertical sync signal generator circuit for making the period of the vertical sync signal stable has been described, and almost the same technique can be used if a horizontal sync signal generator circuit for making the period of a horizontal sync signal stable is configured. If the horizontal sync signal is handled, the jitter in the reference edge of the horizontal sync signal resulting from the synchronization of the horizontal sync signal with the clock may not be wanted, and if so, the sync signal generator circuit can be implemented by configuring some circuits except counters with sequential circuits which do not use clock.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A sync signal generator circuit which receives a first sync signal to generate a second sync signal, comprising:

a first counter which counts predetermined clock pulses to output a counted value and which resets the counted value of said first counter each time said first counter detects a reference edge of the first sync signal;

a first register which holds a first value $N_i$ which is the counted value of said first counter immediately before said first counter is reset;

a reset signal generator which generates a reset pulse;

a second counter which counts predetermined clock pulses to output a counted value and which resets the counted value of said second counter each time said second counter receives the reset pulse;

a second register which holds a second value $N_o$ which is the counted value of the second counter immediately before said second counter is reset; and a sync pulse generator which generates the second sync signal on the basis of the reset pulse;

wherein said reset signal generator generates the reset pulse each time the counted value of said second counter matches a predetermined value $N_p$ or each time the first counter detects the reference edge of the first sync signal while an absolute value of a difference between the counted value of said second counter and the second value $N_o$ is not greater than a predetermined permissible value $N_j$ of a period fluctuation of the second sync signal, the predetermined value $N_p$ being equal to a reference value $N_r$ if the reference value $N_r$, which is predetermined on the basis of the first value $N_i$, is equal to the second value $N_o$, the predetermined value $N_p$ being greater than the second value $N_o$ and not greater than a value $N_o+N_j$ if the reference value $N_r$ is greater than the second value $N_o$, the predetermined value $N_p$ being not smaller than a value $N_o-N_j$ and smaller than the second value $N_o$ if the reference value $N_r$ is smaller than the second value $N_o$.

2. The sync signal generator circuit according to claim 1, wherein said reset signal generator comprises:

a timing signal generator which generates a timing pulse on the basis of the reference edge of the first sync signal and the counted value of said second counter;

a gate signal generator which generates a gate signal, the gate signal being in an open state from the instant when the counted value of the second counter becomes not smaller than a predetermined value to the instant when the reset signal generator generates the reset pulse, the gate signal being in a close state at the other times; and a gate circuit which allows passage of the timing pulse as the reset pulse when the gate signal is in the open state and which inhibits passage of the timing pulse when the gate signal is in the close state.

3. The sync signal generator circuit according to claim 1, further comprising a mode discrimination circuit, said mode discrimination circuit outputting a first mode discrimination signal if the first value $N_i$ is kept to be not smaller than a predetermined lower-limit value $N_a$ and smaller than a predetermined upper-limit value $N_b$ throughout a first predetermined period, said mode discrimination circuit outputting a second mode discrimination signal if the first value $N_i$ is kept to be smaller than the lower-limit value $N_a$ or not smaller than the upper-limit value $N_b$ throughout a second predetermined period, said mode discrimination circuit continuing outputting the immediately preceding discrimination signal at the other conditions;

wherein if said mode discrimination circuit is outputting the second mode discrimination signal, said reset signal generator generates no reset pulse even when the first counter detects the reference edge of the first sync signal while the absolute value of the difference between the counted value of said second counter and the second value $N_o$ is not greater than the predetermined permissible value $N_j$.

4. The sync signal generator circuit according to claim 3, further comprising an external circuit which changes the lower-limit value $N_a$ and the upper-limit value $N_b$ on the basis of the first value $N_i$.

5. The sync signal generator circuit according to claim 3, wherein the reference value $N_r$ is set to $N_i+N_j$ or $N_i-N_j$ when said mode discrimination circuit is outputting the first mode discrimination signal; and wherein the reference value $N_r$ is set to a predetermined free-running period value $N_f$ when said mode discrimination circuit is outputting the second mode discrimination signal.

6. The sync signal generator circuit according to claim 5, further comprising an external circuit which changes the free-running period value $N_f$ on the basis of the first value $N_i$.

7. The sync signal generator circuit according to claim 1, wherein the reference value $N_r$ is set to a value greater than the first value $N_i$ and smaller than $N_i+N_j$ if the first value held in said first register is equal to the second value held in said second register or if the generation of the reset pulse by said reset signal generator results from the detection of the reference edge of the first sync signal.

8. The sync signal generator circuit according to claim 1, further comprising a noise masking circuit which selectively allows passage of the reference edge of the first sync signal, wherein said noise masking circuit inhibits passage of the reference edge of the first sync signal when the counted value of said first counter is not greater than a predetermined value; and wherein the reset of said first counter is performed on the basis of the reference edge of the first sync signal which has passed through said noise masking circuit.

9. The sync signal generator circuit according to claim 3, further comprising a phase detector which detects whether the reference edge of the first sync signal leads or lags behind with respect to the reset pulse by comparing either the counted value of said second counter when the first counter detects the reference edge of the first sync signal or the counted value of said first counter when the reset signal generator generates the reset pulse with a predetermined threshold;

wherein if said mode discrimination circuit is outputting the first mode discrimination signal and said phase detector judges that the reference edge of the first sync signal is leading with respect to the reset pulse, the reference value $N_r$ is set to a value not smaller than $N_i-N_j$ and not greater than the first value $N_i$; and wherein if said mode discrimination circuit is outputting the first mode discrimination signal and said phase detector judges that the reference edge of the first sync signal is lagging behind with respect to the reset pulse, the reference value $N_r$ is set to a value not smaller than the first value $N_i$ and not greater than $N_i+N_j$.

10. The sync signal generator circuit according to claim 1, wherein said reset signal generator includes a state machine, a state of which is changed on the basis of the first value $N_i$; and wherein the reference value $N_r$ is determined on the basis of the state of said state machine.

* * * * *